United States Patent
Singh et al.

(10) Patent No.: US 8,415,556 B2
(45) Date of Patent: Apr. 9, 2013

(54) COPPER DELAFOSSITE TRANSPARENT P-TYPE SEMICONDUCTOR THIN FILM DEVICES

(75) Inventors: Kaushal K. Singh, Santa Clara, CA (US); Omkaram Nalamasu, San Jose, CA (US); Nety Krishna, Sunnyvale, CA (US); Michael Snure, Salt Lake City, UT (US); Ashutosh Tiwari, Sandy, UT (US)

(73) Assignee: Applied Materials, Inc., Santa Clara, AZ (US)

( * ) Notice: Subject to any disclaimer, the term of this patent is extended or adjusted under 35 U.S.C. 154(b) by 498 days.

(21) Appl. No.: 12/643,380

(22) Filed: Dec. 21, 2009

(65) Prior Publication Data

US 2010/0175755 A1 Jul. 15, 2010

Related U.S. Application Data

(60) Provisional application No. 61/203,336, filed on Dec. 19, 2008.

(51) Int. Cl.
*H01L 31/00* (2006.01)
(52) U.S. Cl.
USPC ........... 136/258; 136/265; 136/262; 136/260; 136/261
(58) Field of Classification Search .................. 423/276, 423/277, 279, 593.1, 604; 136/253, 258, 136/265, 260, 261, 262
See application file for complete search history.

(56) References Cited

U.S. PATENT DOCUMENTS

| | | | |
|---|---|---|---|
| 6,696,700 B2 | 2/2004 | Gong et al. | 257/43 |
| 6,806,503 B2 | 10/2004 | Hosono et al. | 257/29 |
| 6,979,435 B1 | 12/2005 | Shahriari et al. | 423/593.1 |
| 7,026,713 B2 | 4/2006 | Hoffman et al. | 257/749 |
| 7,309,895 B2 | 12/2007 | Hoffman et al. | 257/347 |
| 7,329,915 B2 | 2/2008 | Herman et al. | 257/288 |
| 2003/0041894 A1* | 3/2003 | Sverdrup et al. | 136/251 |
| 2003/0201164 A1 | 10/2003 | Johnson et al. | 204/192.29 |
| 2006/0104893 A1 | 5/2006 | Shahriari et al. | 423/600 |

OTHER PUBLICATIONS

Snute et al "CuBO2: a p-type transparent oxide", Applied Physics Letters 91, pp. 092123-1-092123-3 (2007), published online on Aug. 30, 2007.*
Bandara et al "P-Type Oxide Semiconducotrs as Hole Collectors in Dye Sensitized Solide State Solar Cells", Semicondcutor Science and Technology, vol. 22, pp. 20-24 (2007), published on line Nov. 21, 2006.*
Snure, Michael, et al.; "$CuBO_2$: *p*-type transparent oxide," Appl. Phys. Lett. 91, 092123 (2007).

(Continued)

*Primary Examiner* — Alexander Kollias
(74) *Attorney, Agent, or Firm* — Mark J. Danielson; Pillsbury Winthrop Shaw Pittman LLP

(57) ABSTRACT

Methods for fabrication of copper delafossite materials include a low temperature sol-gel process for synthesizing $CuBO_2$ powders, and a pulsed laser deposition (PLD) process for forming thin films of $CuBO_2$, using targets made of the $CuBO_2$ powders. The $CuBO_2$ thin films are optically transparent p-type semiconductor oxide thin films. Devices with $CuBO_2$ thin films include p-type transparent thin film transistors (TTFT) comprising thin film $CuBO_2$ as a channel layer and thin film solar cells with $CuBO_2$ p-layers. Solid state dye sensitized solar cells (SS-DSSC) comprising $CuBO_2$ in various forms, including "core-shell" and "nano-couple" particles, and methods of manufacture, are also described.

16 Claims, 20 Drawing Sheets

Single-Junction Solar Cell

OTHER PUBLICATIONS

Taguchi, Taketo, et al.; "Improving the performance of solid-state dye sensitized solar cell using MgO-coated $TiO_2$ nanoporous film," Chem. Commun., 2003, 2480-2481.

Bandara, Jayasundera, et al., "Solid-state dye-sensitized solar cell with p-type NiO as a hole collector," Solar Energy Materials & Solar Cells 85 (2005) 385-390.

Staros, James V., et al.; "Enhancement by N-Hydroxysulfosuccinimide of Water-Soluble Carbodiimide-Mediated Coupling Reactions," Analytical Biochemistry 156, 220-222 (1986).

Zhang, Jun-Long, et al.; "Oxidation Chemistry of Poly(ethylene glycol)-Supported Carbonylruthenium(II) and Dioxuruthenium(VI) meso-Tetrakis (pentafluorophenyl) porphyrin," Chem. Eur. J. 2006, 12, 3020-3031.

Bandara, J., et al.; "p-type oxide semiconductors as hole collectors in dye-sensitized solid-state solar cells," Semicond. Sci. Technol. 22 (2007) 20-24.

Rajh, Tijana, et al.; "Surface Modification of Small Particle $TiO_2$ Colloids with Cysteine for Enhanced Photochemical Reduction: An EPR Study," J. Phys. Chem. 1996, 100, 4538-4545.

Maruyama, Yoshihiko, et al.; "Visible Light Sensitive Photocatalyst, Delafossite Structured a-AgGaO2," J. Phys. Chem. B 2006, 110, 23274-23278.

International Search Report and Written Opinion for PCT Application No. PCT/US2009/069055 issued Aug. 13, 2010.

* cited by examiner

Process for Making CuBO$_2$ Powders

COPPER DELAFOSSITE TRANSPARENT P-TYPE SEMICONDUCTOR THIN FILM DEVICES

CROSS-REFERENCE TO RELATED APPLICATIONS

This application claims the benefit of U.S. Provisional Application Ser. No. 61/203,336 filed Dec. 19, 2008, incorporated by reference in its entirety herein.

FIELD OF THE INVENTION

The present invention relates to transparent p-type semiconductor materials, more specifically methods of manufacture of copper delafossite transparent p-type semiconductor material and devices comprising said copper delafossite material, including solar cells and transparent thin film transistors.

BACKGROUND OF THE INVENTION

Transparent conductive oxides (TCOs), such as doped zinc oxide, indium tin oxide (ITO) and indium molybdenum oxide are widely used as conductive optically transparent electrodes. These oxides exhibit both high electrical conductivity and optical transparency, in the visible spectrum. However, all of these oxides are characterized as n-type materials and their use is accordingly limited. In order to expand the use of TCOs to applications such as solar cells, transparent transistors, transparent light emitting diodes (LEDs), ultraviolet (UV) detectors, etc. there is a need for optically transparent conductive p-type materials which are compatible with the existing n-type TCOs. There is also a need for transparent p-type semiconductor materials that can be incorporated in devices with low cost substrates that may limit process temperatures. Furthermore, there is a need for methods and apparatuses for forming these materials.

In recent years, dye-sensitized solar cells (DSSCs) have received considerable attention as a cost-effective alternative to conventional solar cells. DSSCs operate on a process that is similar in many respects to photosynthesis, the process by which green plants generate chemical energy from sunlight. Central to these cells is a thick semiconductor nanoparticle film (electrode) that provides a large surface area for the adsorption of light harvesting organic dye molecules. Dye molecules absorb light in the visible region of the electromagnetic spectrum and then "inject" electrons into a nanostructured semiconductor electrode. This process is accompanied by a charge transfer to the dye from an electron donor mediator supplied by an electrolyte, resetting the cycle. DSSCs based on liquid electrolytes have reached efficiencies as high as 11% under AM 1.5 (1000 W m$^{-2}$) solar illumination. However, a major problem with these DSSCs is the evaporation and possible leakage of the liquid electrolyte from the cell. This limits the stability of these cells and also poses a serious problem in the scaling up of DSSC technology for practical applications.

Presently, tremendous efforts are being focused on fabricating solid state DSSCs (SS-DSSCs) by replacing liquid electrolytes with solid electrolytes such as molten salts, organic hole transport materials, and polymer electrolytes. However, most of the SS-DSSCs suffer from the problems of short-circuit and mass transport limitations of the ions, and so have low conversion efficiencies compared with the liquid version. There is a need for: solid electrolyte materials for making stable, high efficiency SS-DSSCs; process tools for making said solid electrolyte materials; new designs of SS-DSSCs comprising said solid electrolyte materials; and manufacturable methods of making said materials and said SS-DSSCs.

SUMMARY OF THE INVENTION

Embodiments of this invention include methods for fabrication of Cu delafossite materials, equipment for said fabrication, devices including said materials and methods of making said devices.

Certain embodiments of the present invention are processes for making Cu delafossite materials including: a low temperature sol-gel process for synthesizing $CuBO_2$ materials; a process which controls the band gap of the $CuBO_2$ material by controlling the particle size; a process for making ultrafine powders of $CuBO_2$ capable of penetrating a dyed porous $TiO_2$ network; a process for forming $TiO_2$—$CuBO_2$ "core-shell" nanoparticles; a process for forming $TiO_2$—$CuBO_2$ "nano-couples"; and a deposition process for forming thin films of $CuBO_2$, such as pulsed laser deposition. For example, according to some embodiments of the present invention a method of fabricating a copper boron oxide thin film on a substrate comprises: producing a copper boron oxide powder by a low temperature sol-gel process; compressing the copper boron oxide powder to form a target; and forming the copper boron oxide thin film on the substrate using the target in a thin film deposition tool, such as a pulsed laser deposition tool.

Certain embodiments of the present invention are equipment for fabricating $CuBO_2$ materials including a nanopowder production system.

Certain embodiments of the present invention are devices comprising Cu delafossite materials including: a transparent thin film transistor comprising thin film $CuBO_2$ as a channel layer; p-i-n and p-n solar cells comprising thin film $CuBO_2$ as a p-layer; and solid state-dye sensitized solar cells (SS-DSSCs) comprising $CuBO_2$ in various forms, including "core-shell" and "nano-couple" particles.

Certain embodiments of the present invention are methods of making Cu delafossite-containing devices including: fabricating a SS-DSSC by impregnating a dyed porous $TiO_2$ network with ultrafine $CuBO_2$ powders; fabricating a SS-DSSC using a sol-gel technique to deposit $CuBO_2$ particles into the pores of a $TiO_2$ network; fabricating a SS-DSSC by preparing a porous network of $CuBO_2$ in which $TiO_2$ particles are embedded; fabricating a SS-DSSC by using $TiO_2$—$CuBO_2$ "core-shell" nanoparticles; and fabricating a SS-DSSC by using $TiO_2$—$CuBO_2$ "nano-couples".

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The examples provided herein are directed primarily to $CuBO_2$ materials; however, many of the concepts are applicable to other Cu delafossite materials, for example $CuAlO_2$, $CuGaO_2$ and $CuInO_2$. Furthermore, the examples of devices provided herein are directed to solar cell devices and transparent thin film transistors; however, for similar reasons, other devices can also benefit from incorporating transparent p-type semiconducting materials, including transparent thin film photovoltaics, transparent p-n diodes, visible and ultraviolet photodetectors, devices for photoelectrolysis for hydrogen production, and other devices for displays and low-E glazing applications. $AgBO_3$, $TlBO_3$ and alloys of $Cu_{1-x}Ag_xBO_2$ p-type transparent semiconductors can be used, in addition to $CuBO_2$. The sol-gel process used for synthesizing the $CuBO_2$ powders can be modified for synthesis of thin-films by solution deposition techniques such as: dip coating, spray coating, ink jet printing or spin coating. This modified sol-gel process can be used as a low temperature technique for depositing thin films on a wide variety of substrates including ceramic, single crystal and temperature sensitive substrates such as glass, metal foil, and plastics.

Herein, unless indicated otherwise, the terms copper boron oxide and $CuBO_2$ are used interchangeably to refer to optically transparent p-type semiconductor materials which have the general composition and stoichiometry of $CuBO_2$ and the delafossite crystal structure.

Processes for Synthesizing $CuBO_2$ Powders & Films

Figure 1:
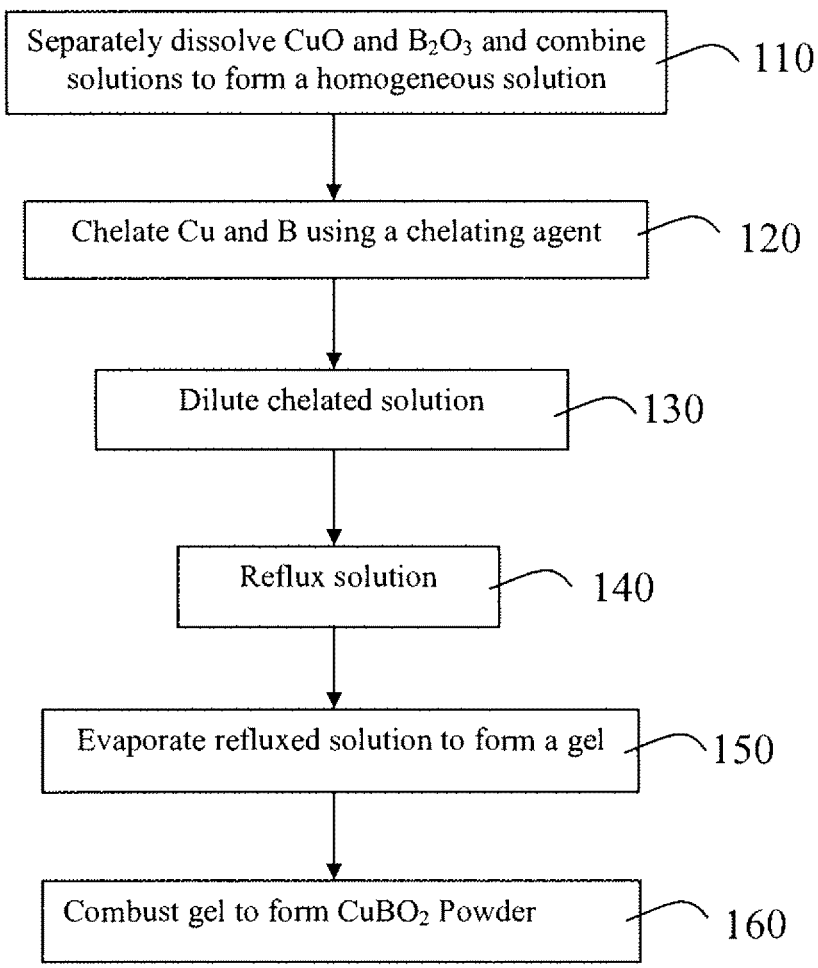
FIG. 1 is a schematic flow diagram illustrating the $CuBO_2$ sol-gel process, according to embodiments of the invention.

A new technique has been developed for synthesizing $CuBO_2$ powders via a low temperature wet process. FIG. 1 shows a schematic flow diagram of the processing technique. In this technique CuO and $B_2O_3$ are dissolved in nitric acid and water, respectively, and the two solutions are combined to form a homogeneous solution (110). In order to achieve a stoichiometric powder, the molar ratio of Cu to B is 1:1. Citric acid is then added to the solution in a 2:1 citric acid to Cu molar ratio (120). Citric acid is a chelating agent which bonds to the metal ions—one citric acid molecule chelates one copper and one boron atom. The solution was then diluted with de-ionized water increasing the volume by 10 tunes (130). This solution is then refluxed for approximately 18 hrs. at 100° C. (140). After refluxing, the solution is evaporated creating a gel network (150). Further heating of the gel to a temperature in the range of 160 to 200° C. results in an exothermic reaction (combustion) producing the $CuBO_2$ powders (160). Reacted powders are calcined at a temperature in the range of 300 to 500° C. for approximately 2 hrs. to remove any residual carbon.

Dilution of the citric acid solution was done in order to prevent metal precipitation during refluxing. The reason for the excess citric acid is because the citric acid is not fully dissociated into ions in solution, and better quality films are produced when all of the Cu and B are chelated; although, this must be balanced with minimizing excess carbon formed from the citric acid during combustion of the gel. In summary, the ratio of citric acid to Cu should be in excess of 1:1, and a ratio of approximately 2:1 is found to provide satisfactory results.

Figure 2:
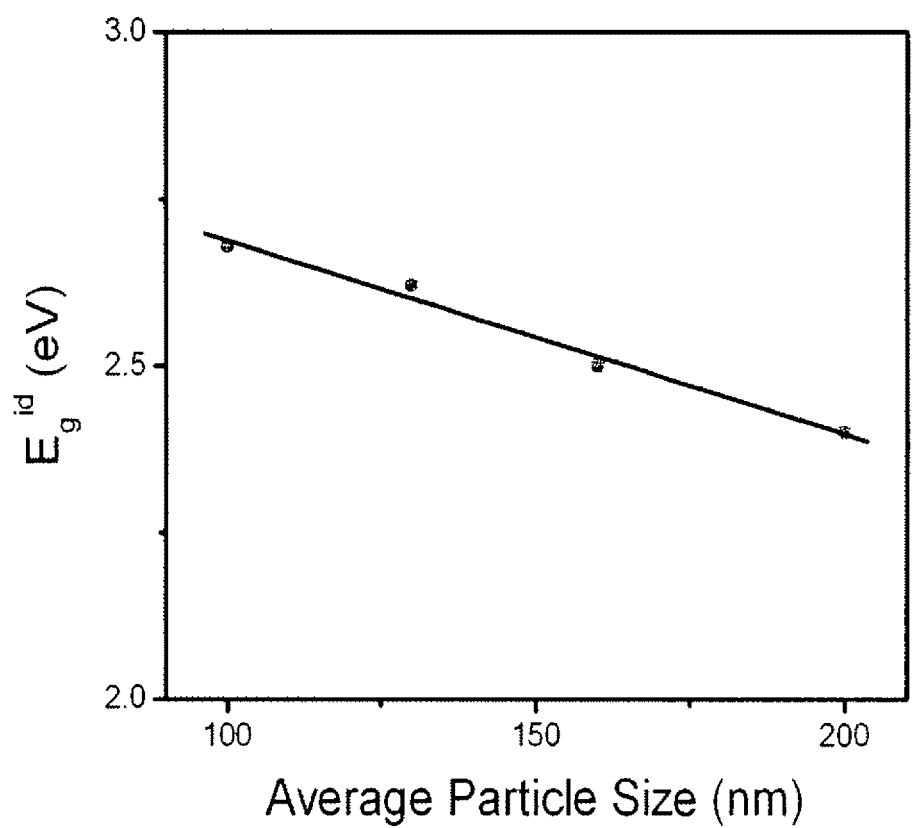
FIG. 2 is a graph showing the variation of the indirect band-gap of $CuBO_2$ with particle size.

Furthermore, the band-gap of $CuBO_2$ particles may be adjusted by controlling the particle size. Copper delafossite powders are synthesized from gels, as described above. The particle size of the resulting $CuBO_2$ powders is controlled by varying the temperature of the gel to solid reaction. As described above, this reaction occurs in the range of 160 to 200° C. under ambient conditions. In order to reduce the reaction temperature, the system pressure is reduced—the gel to solid process is carried out by heating under vacuum. For example, the gel to solid process was carried out at 70 and 100° C. under vacuum at 50 Torr. The color of the as synthesized powders is an indicator of the process temperature, i.e. lower process temperature gives smaller particles and blue shifted color. For example, the powder formed at 70° C. under vacuum is blue in color, whereas the powder formed at 160° C. in air is red-brown in color. Furthermore, post annealing or calcining of powders causes particle size to increase and results in red shifting. All powders calcined at 500° C. are a red-brown indicating similar particle size. Powder samples of $CuBO_2$ produced at lower temperature showed slightly higher band gaps. FIG. 2 shows a plot of the indirect band-gap of $CuBO_2$ as a function of the average particle size. As the average particle size decreases from 200 nm to about 100 nm, the indirect band gap increases from 2.4 eV to 2.6 eV. Note that the 200 nm particles were formed using the above process at 70° C. under vacuum and the 200 nm particles were formed at 200° C. under ambient conditions. The indirect band gap was measured using an ultraviolet-visible spectrophotometer. The particle size was measured by x-ray diffraction using Scherrer's formula which relates diffraction peak broadening to crystallite size. Note that as the particle size is reduced further, the band gap will continue to increase.

One inch targets were prepared using the nanopowders described above by pressing the powder under 5 MPa, followed by pressing in an isostatic press for 20 minutes under 20 MPa. These press targets were then placed in a vacuum chamber of a pulsed laser deposition system.

Substrates, such as transparent conducting oxide coated glass, were ultrasonically cleaned in three organic solvents in the order: acetone, isopropanol, and then methanol. The substrates were then rinsed in clean methanol and dried with dry air. The substrates were then mounted onto the substrate heater of the pulsed laser deposition system. The vacuum chamber containing the deposition target and substrate was sealed and evacuated to a vacuum of $1 \times 10^{-6}$ Torr. Once a pressure of $1 \times 10^{-6}$ Torr was reached, the target was cleaned in situ by ablating the surface. A laser energy of 2 J/cm$^2$, laser pulse frequency of 10 Hz and target rotation speed of 18°/s were used for this cleaning process. To ensure all surface contamination was removed, the target was ablated with two full rotations. After cleaning the substrate, the chamber was again evacuated to $1 \times 10^{-6}$ Torr and the substrate heated (to 500° C.) at a rate of 10° C./min. Prior to deposition, the substrate was held at a constant temperature for 10 minutes. Due to the low temperature requirements of the TCO coated glass substrate, low deposition temperatures were used. After 10 minutes, high purity $O_2$ gas was introduced into the chamber with a partial pressure roughly within the range of 1 mTorr to 0.1 Torr. Once the $O_2$ pressure reached equilibrium the deposition process was started. Targets were ablated using a KrF excimer laser with a photon wavelength of 248 nm and pulse duration of 25 ns. A laser energy of 2 J/cm$^2$, laser pulse frequency of 10 Hz and target rotation speed of 18°/s were used for deposition. These conditions resulted in a growth rate of 0.5 Å/pulse. Film thicknesses were varied from 80 to 500 Å. After the deposition was complete, the substrate was cooled in an $O_2$ atmosphere in order to prevent reduction of the deposited film. Reduction of the copper delafossite films is undesirable since it results in excess oxygen vacancies and decomposition of the films. When room temperature was reached, films were removed from the vacuum chamber and stored under vacuum to reduce contamination.

When substrates are used which are tolerant of higher processing temperatures, the deposition temperature may be varied over a wider range, including higher temperatures. In these circumstances, the film properties may be optimized by varying deposition temperature and oxygen pressure over wider ranges. Some examples are provided below. In alternative embodiments of the present invention, sapphire, silicon, or other substrates tolerant of high processing temperatures may be used. When depositing $CuBO_2$ on one of these high temperature substrates, the deposition process follows the same general steps as described above with the exception of the deposition temperatures and oxygen pressures. The deposition temperature and oxygen partial pressure may be varied between 350 and 700° C. and $10^{-6}$ and $10^{-1}$ Torr, respectively, to determine optimum growth conditions. For example, for a $CuBO_2$ channel transistor on a silicon substrate, deposition temperature and oxygen pressure of 550° C. and $10^{-1}$ Torr, respectively, were found to be ideal for device performance.

Typical $CuBO_2$ thin films deposited using the above techniques are nanocrystalline, with a grain size of approximately 20 nanometers. Optical transmission is in excess of 50% over the measured wavelength range of 200 to 900 nanometers. Values of direct and indirect bandgaps were estimated to be roughly 4.5 eV and 2.4 eV, respectively. Electrical conductivity was measured to be roughly 1.5 Scm$^{-1}$. The material is p-type, with estimated carrier Hall mobility of approximately 100 cm$^2$V$^{-1}$s$^{-1}$. The material has the general composition and stoichiometry of $CuBO_2$ and the delafossite crystal structure.

The transparent semiconducting copper delafossite thin films may be used in a variety of devices, for example: transparent light emitting diodes (LEDs), ultraviolet (UV) detectors, solar cells, transparent transistors, etc. Some specific examples of devices are provided below.

However, there are some applications in which very small $CuBO_2$ particles, smaller than the typically 200 nanometer size particles produced by the sol-gel process described above, are desired. A laser assisted fabrication system was designed and fabricated for preparing nano-sized $CuBO_2$ powders. Using this system, it is possible to continuously produce nano-scaled powders under well-defined and stable conditions.

Figure 3:
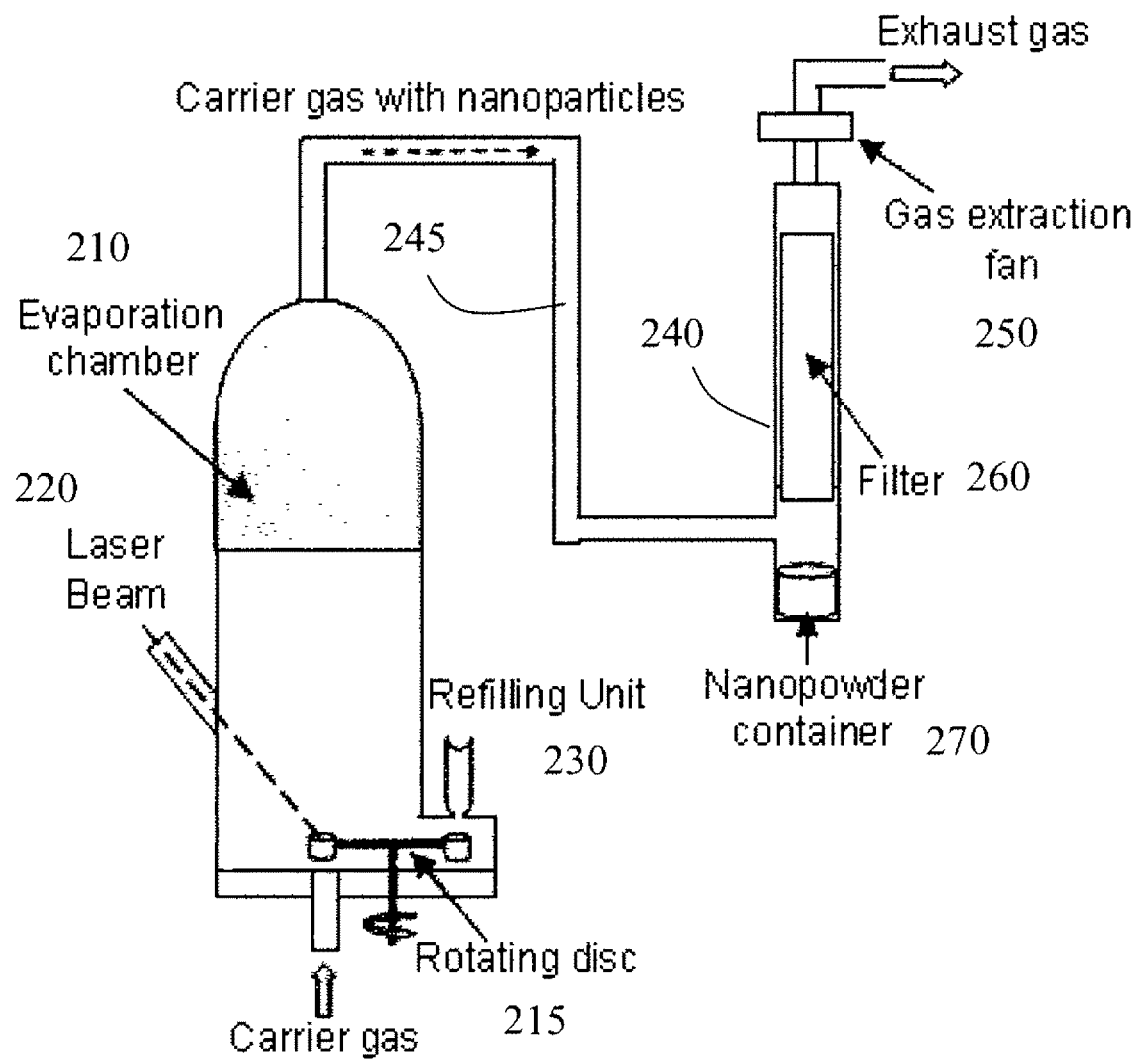
FIG. 3 is a schematic of equipment for nanopowder production, according to embodiments of the invention.

FIG. 3 shows the schematic design of the laser assisted fabrication system. The main part of the evaporation chamber 210 is a continuously rotating disc 215 with a ring-shaped channel along its rim containing the raw powder. The laser beam 220 is focused through an inlet tube onto the revolving powder surface and evaporates the raw material. This technique is very similar to the PLD technique described above for making nanocrystalline films (grain size ~20 nm) of $CuBO_2$. However, in this case, instead of directly depositing the ablated material (in the form of plasma) on a substrate held at high temperature, the ablated material is blown out of the area of the interaction between the laser radiation and the powder target by a constantly flowing inert gas. Due to the steep temperature gradient between the hot evaporation zone and the surrounding atmosphere, nucleation, condensation, and coagulation proceeds very quickly. This results in the formation of ultrafine particles. The constant flow of the inert gas is maintained to rapidly dilute the emerging droplets making the formation of hard agglomerates by edge melting of droplets improbable.

During one revolution of the disc, the evaporated material is automatically refilled by a refilling unit 230 and the surface of the fill is flattened by a scraper. Thereby, a continuously regenerated powder surface is fed to the laser beam, ensuring stable and reproducible process conditions. The evaporation chamber 210 is connected in a gas tight manner to the filtering chamber 240 through a system of glass tubes 245. A gas extraction fan 250, attached to the filtering chamber 240 by a flange, provides for the constant flow of the process gas, which is ingested below the evaporation zone. By this gas flow, the nanoparticles will be dragged into the filtering chamber 240, where they will be separated from the aerosol on a cylindrical paper 260 or metal bag filter. Any particles that fall from the filter 260 are collected in nanopowder container 270. Nanoparticles of approximately 20±5 nanometers diameter were made using this system. This system may be used to make nanoparticles with a distribution centered about a diameter ranging from 5 to 500 nanometers. As discussed above, with reference to FIG. 2, the band gap of the $CuBO_2$ particles is larger for smaller particles.

Solar Cells with $CuBO_2$ P-Layer

Figure 4:
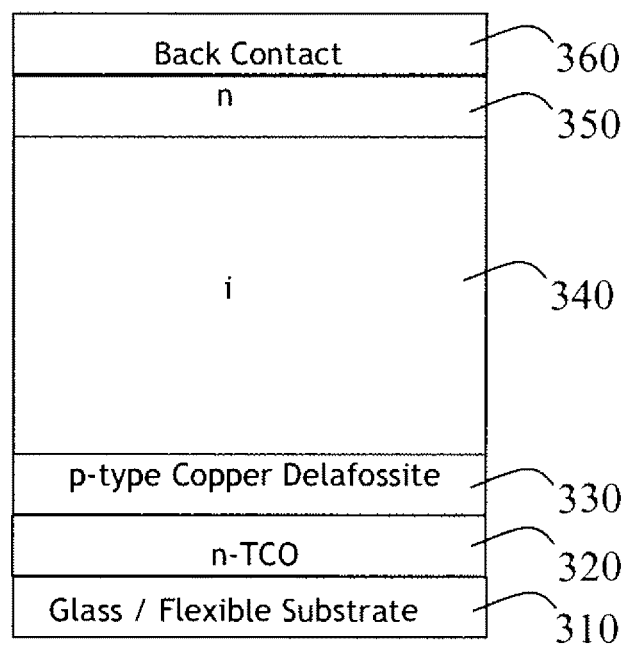
FIG. 4 is a schematic cross-section of a single-junction p-i-n solar cell with a copper delafossite p-layer, according to embodiments of the present invention.

Using the low temperature processes described above, p-type copper boron oxide may be incorporated into a wide variety of solar cells where a transparent p-layer is desired. For example, FIG. 4 shows a single junction amorphous silicon solar cell on a transparent substrate with a transparent p-type copper boron oxide p-layer 330. In more detail, the solar cell in FIG. 4 comprises a glass/flexible substrate 310, a transparent conductive layer 320 such as a thin film of n-type TCO, a thin film of p-type copper boron oxide 330, an amorphous silicon absorber layer 340, an n-type amorphous silicon thin film 350 and a back contact 360. The back contact 360 may be formed of aluminum, aluminum with 1% silicon or nickel, for example. The copper boron oxide film 330 is typically between 8 and 100 nanometers thick.

Figure 5:
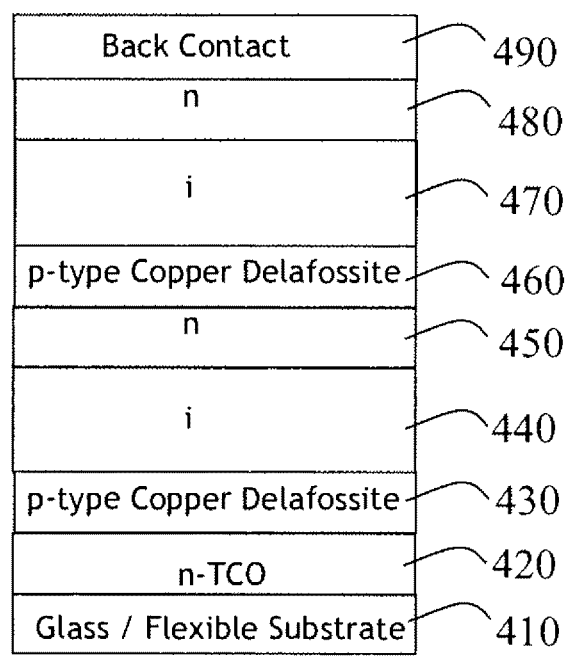
FIG. 5 is a schematic cross-section of a multiple junction p-i-n solar cell with copper delafossite p-layers, according to embodiments of the present invention.

FIG. 5 shows an example of a multiple junction solar cell. The multiple junction solar cell is the same as the single junction solar cell of FIG. 4, except for a second p-i-n stack. The top stack may have a different absorber to the lower stack, for example the i-layer for the upper stack 470 is microcrystalline silicon and the i-layer for the lower stack 440 is amorphous silicon. In more detail, the solar cell in FIG. 5 comprises: a glass/flexible substrate 410; a transparent conductive layer 420 such as a thin film of n-type TCO; a first stack including a thin film of p-type copper boron oxide 430, an i-layer 440 and an n-layer 450; a second stack including a thin film of p-type copper boron oxide 460, an i-layer 470 and an n-layer 480 and a back contact 490. The copper boron oxide films 430 and 460 are between 8 and 100 nanometers thick.

Figure 6:
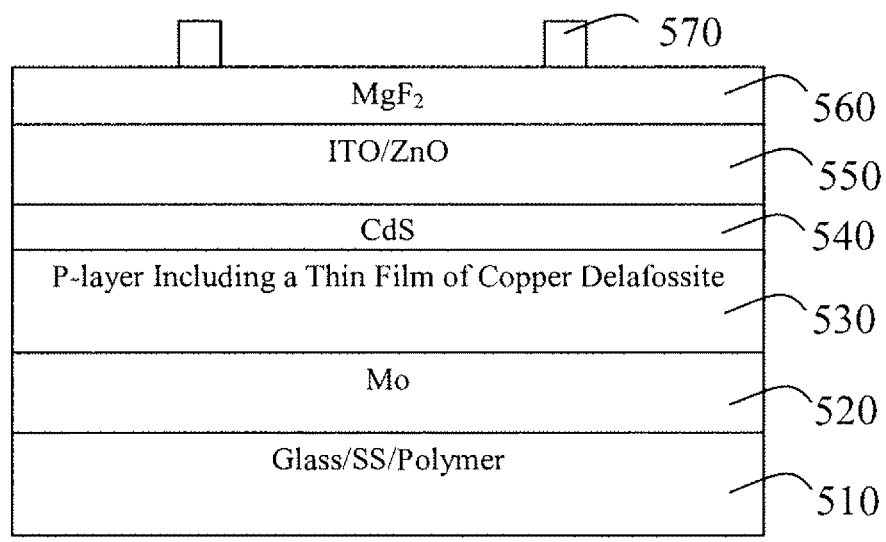
FIG. 6 is a schematic cross-section of a p-n solar cell with a copper delafossite layer within the p-layer, according to embodiments of the invention.

FIG. 6 shows a solar cell with a p-layer 530 comprising an absorber material and a thin film of p-type copper delafossite. The absorber material may be comprised of materials such as copper indium selenide (CIS), copper indium gallium selenide (MS), $Cu(In,Ga)(S,Se)_2$ (ClSSe), CdTe, $Cu_2ZnSnS_4$, or other II-IV binary and ternary compounds. The copper delafossite film may be either between the absorber and the conductive layer 520 or between the absorber and the cadmium sulfide n-type layer 540. In more detail, the solar cell in FIG. 6 comprises a glass/stainless steel/polymer substrate 510, a conductive layer 520 such as a thin film of molybdenum metal, a p-layer 530, an n-layer 540 such as a film of cadmium sulphide, a TCO/buffer layer 550 such as films of ITO/zinc oxide, an anti-reflective layer 560 such as a film of magnesium fluoride and metal contacts 570.

Note that the substrate 510 may typically be 1.5 millimeters thick. The molybdenum layer 520 is typically 0.5-1.5 microns thick and may be sputter deposited on the substrate. The p-layer 530 is typically 1.5-2.0 microns thick and the absorber material may be deposited by a wet chemical process; within the p-layer, the copper delafossite film is typically 0.02 microns thick and may be deposited by the laser ablation process described above. The cadmium sulphide n-layer 540 is typically 0.03-0.05 microns thick and may be deposited by a chemical bath deposition (CBD) process. The ITO/zinc oxide layer 550 is typically 0.5-1.5 microns thick and may be deposited using wet chemical or radio frequency sputtering processes. The magnesium fluoride anti-reflective layer 560 is typically 0.1 microns thick and may be electron beam evaporated. The metal contacts 570 may be made of nickel/aluminum, may have a thickness somewhere in the range of 0.05-3.00 microns depending on the solar cell geometry, and may be electron beam evaporated.

Furthermore, as described earlier, the p-type copper boron oxide in the examples of solar cells given above may be replaced by other p-type copper delafossite materials, such as $CuAlO_2$, $CuGaO_2$ and $CuInO_2$. Yet further, for purposes of improving the quantum efficiency of the solar cell, the p-type copper boron oxide thin film may be replaced by two thin films: a film of a copper delafossite material, and a film of a second material such as p-type amorphous silicon, p-type microcrystalline silicon or p-type microcrystalline silicon carbide.

Transparent Thin Film Transistors (TTFTs) with $CuBO_2$ Channel Layers

Transparent thin film transistors (TTFT's) have recently become of great interest for invisible microelectronics and drivers for organic and flat panel displays. All transistor components—the gate, gate dielectric, drain, source and a transparent oxide semiconductor channel layer—can all be made from stable and transparent oxide materials. However, only n-type oxide semiconductor TTFT's have been widely demonstrated with great success. For most applications complementary p-type TTFT's are required. $CuBO_2$ is a viable p-type wide band gap semiconductor for making p-type TTFTs.

Figure 7:
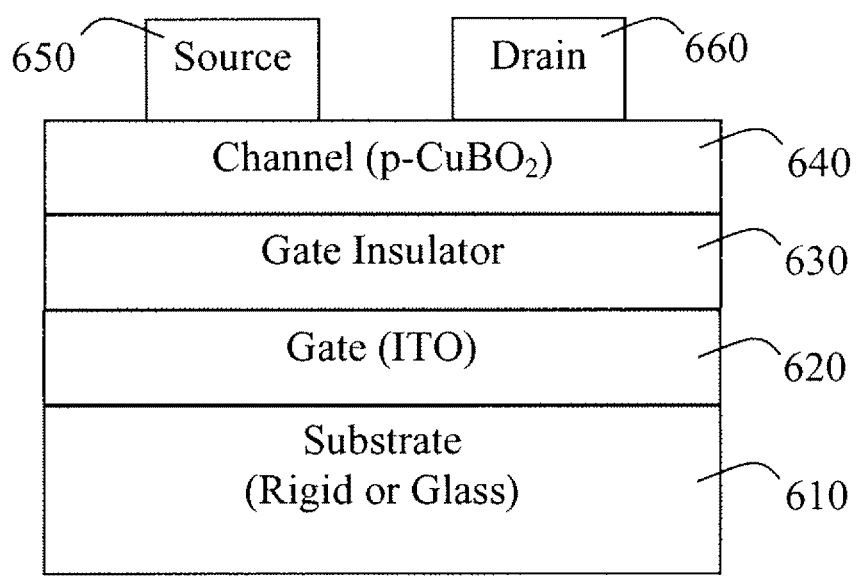
FIG. 7 is a schematic cross-section of a $CuBO_2$ transparent thin film transistor (TTFT), according to embodiments of the present invention.

FIG. 7 shows a schematic cross-section of a TTFT with a p-type $CuBO_2$ channel 640. The TTFT comprises a substrate 610, a gate 620, a gate insulator 630, a p-type $CuBO_2$ channel 640, a source 650 and a drain 660. The substrate 610 may be glass or some other rigid material such as a polymer. The gate 620 may be a TCO such as ITO. The gate insulator 630 may be a dielectric such as $Al_2O_3$, $HfO_2$, $ZrO_2$ and rare earth oxides. The channel 640 is typically 100-300 nanometers thick. In fabricated TTFTs the channel layer length was varied between 100 and 500 μm and the width between 0.5 and 5 mm. The $CuBO_2$ channel 640 may be deposited by pulsed laser deposition (PLD) onto the insulator layer 630. The deposition parameters are the same as those described above. The source contact 650 and drain contact 660 may be a 10 nm thick metal layer, such as platinum, or a 100 nm thick transparent conducting oxide (TCO) layer, such as ITO, aluminum-doped zinc oxide and fluorine-doped tin oxide. Drain and source contacts 650, 660 were sputtered on top of the channel layer 640.

Figure 8:
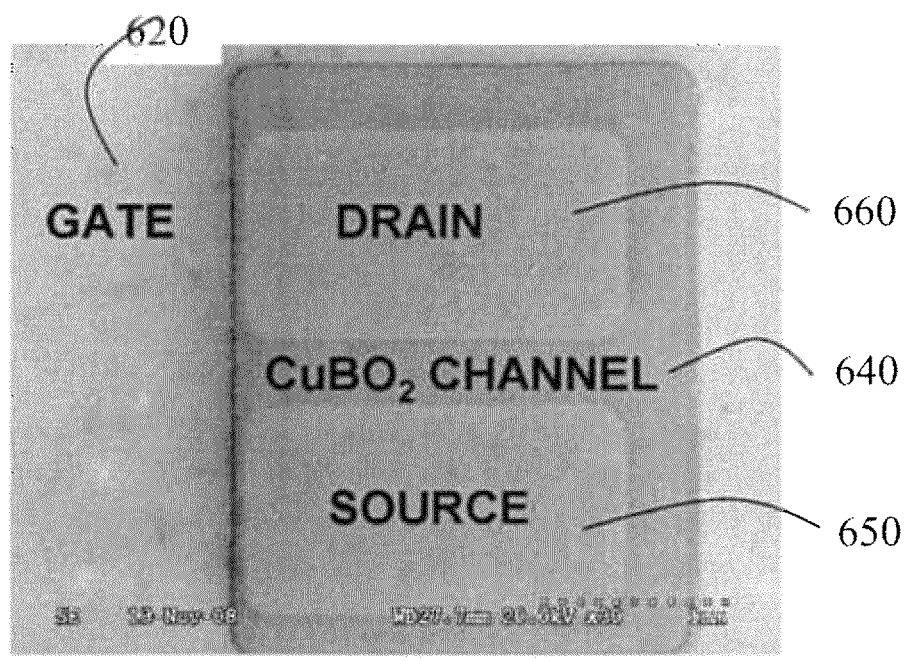
FIG. 8 is a scanning electron micrograph of a $CuBO_2$ TTFT, according to embodiments of the invention.

FIG. 8 shows a scanning electron micrograph of a single TTFT such as shown in FIG. 7. FIG. 8 is a top view of a device in which the gate 620, $CuBO_2$ channel 640, drain 650 and source 660 are imaged.

The deposition temperature for the $CuBO_2$ channel 640 plays a very critical role on device performance. In an ideal field effect transistor (FET) the dielectric layer (gate insulator) has very high resistance since a finite resistance allows current leakage through the dielectric layer harming device performance. For the $CuBO_2$ channel TTFTs, the resistance between the gate and source depends sensitively on the $CuBO_2$ thin film deposition temperature. The higher the deposition temperature the lower the gate source resistance. The temperature dependence of gate to source resistance is due to diffusion of Cu and B elements through the dielectric layer reducing the resistance. This is not the only consideration for selecting an ideal deposition temperature since there is a minimum thermodynamic temperature required to form $CuBO_2$. A deposition temperature of 550° C. may be the ideal balance between these temperature requirements. However, the substrate material may limit the deposition temperature to approximately 500° C.

In order to prevent the diffusion of parasitic elements like Cu and B into the dielectric layer a diffusion barrier (not shown in FIG. 7) may be added between the channel 640 and dielectric layer (gate insulator) 630. The diffusion barrier is a thin film deposited on the dielectric layer 630, the $CuBO_2$ film (channel layer) 640 being formed on top of the diffusion barrier layer. The diffusion barrier should be thin, non-reactive with the dielectric material and $CuBO_2$ and impede diffusion of Cu or B into the dielectric layer. Diffusion barriers based on transition metal and rare earth oxides, like $Ta_2O_5$, or transition metal and rare earth nitrides, like TaN, may be suitable. The use of such barriers may reduce current leakage through the gate dielectric.

Furthermore, as described earlier, the p-type copper boron oxide in the examples of TTFTs given above may be replaced by other p-type copper delafossite materials, such as $CuAlO_2$, $CuGaO_2$ and $CuInO_2$.

Solid State Dye-Sensitized Solar Cells Using $CuBO_2$

In order to be useful in DSSCs, a p-type semiconductor and a dye are required to have the following properties: (i) the p-type material must be transparent throughout the visible spectrum, where the dye absorbs light (in other words the semiconductor must have a large band-gap), (ii) a method must be available for depositing the p-type material without dissolving or degrading the monolayer of dye on the $TiO_2$ nanocrystallites (n-type semiconductor), (iii) the dye must be such that its excited level is located above the bottom of the conduction band of $TiO_2$ and the ground level below the upper edge of the valence band of the p-type material. This condition is essential for ensuring the separation of photo-generated electron-hole pairs.

Figure 9:
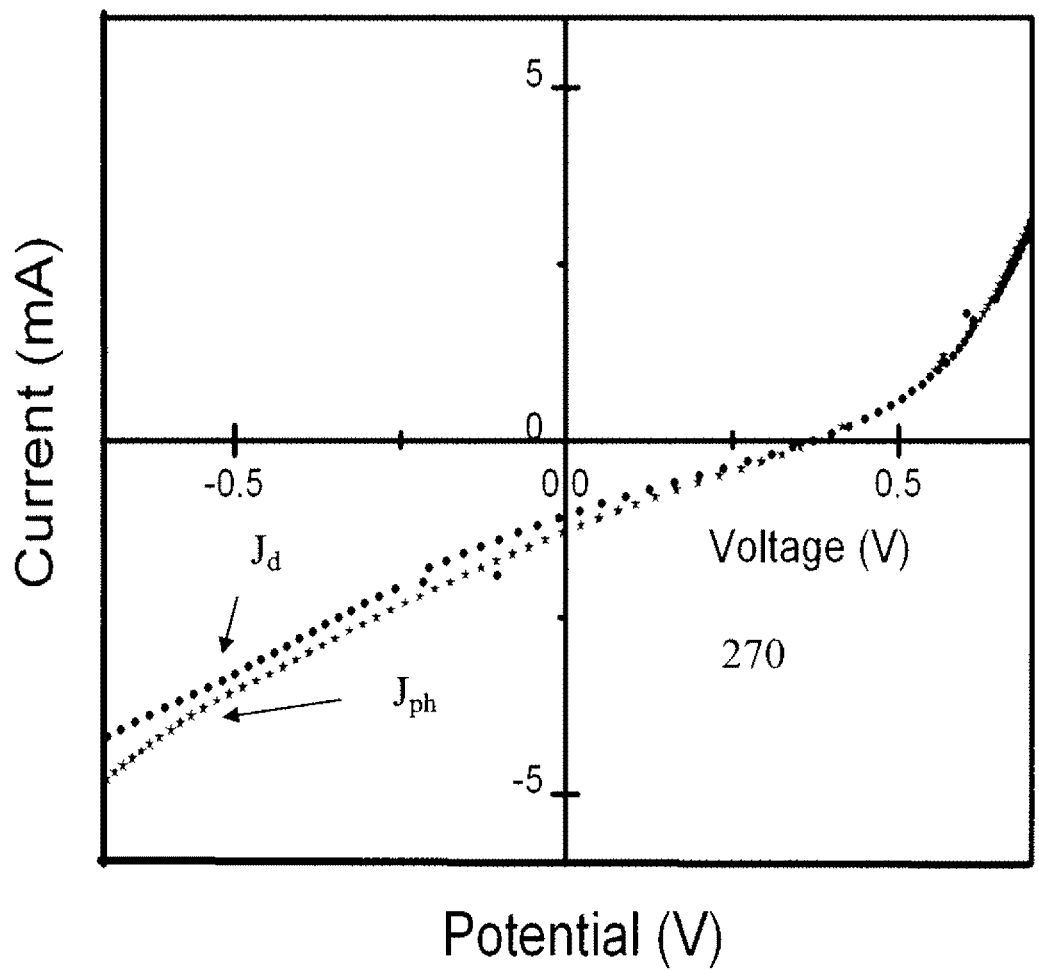
FIG. 9 is a graph of the instantaneous photocurrent $J_{ph}$ and dark current $J_d$ of $CuBO_2$ vs. potential for a $CuBO_2$ pellet fabricated according to embodiments of the invention.

$CuBO_2$ may be used as a hole collector in $TiO_2$ based DSSCs. To extract holes from the dye, the valance band edge of the material should be above the ground level of the dye. To determine whether this condition is satisfied by $CuBO_2$, its flat band potential and valence band edge were determined by performing photoelectrochemical characterization. Electrochemical measurements were carried out in 1M solution of KOH (pH 12) using a standard three electrode device. The three electrodes were, a $CuBO_2$ pellet, a large platinum counter electrode and a saturated calomel reference electrode (SCE) to which all potentials were quoted. Note that the $CuBO_2$ pellet is a small disc prepared by: pressing calcined $CuBO_2$, prepared as described above using the sol-gel process, with a uniaxial hydraulic press in a circular dye; and further densifying the pellet by isostatic pressing at 30,000 Psi for 20 minutes. The electrolyte was continuously flushed with pure nitrogen gas. FIG. 9 shows the current-voltage curves, both in the dark as well as under illumination. As can be seen in FIG. 9, the appearance of the photocurrent ($J_{ph}$) started at a potential $V_{ON}$ of +0.21 V and increased in the cathodic direction, which is typical of p-type behavior. The potential $V_{ON}$ can be reasonably considered as the potential ($V_b$) that corresponds to the position of the valence band of the material. The valence band position of $CuBO_2$ was estimated using the known equation:

$$E_{VB}=4.75+eV_{fb}+0.059(pH-pH_{pzzp})$$

$pH_{pzzp}$ is the pH at the point of zero zeta potential (pzzp) and was found to be 8.2. Thus the results showed that the valence band is located at ~5.2 eV below vacuum (0.46 eV vs. SCE.

Figure 10:
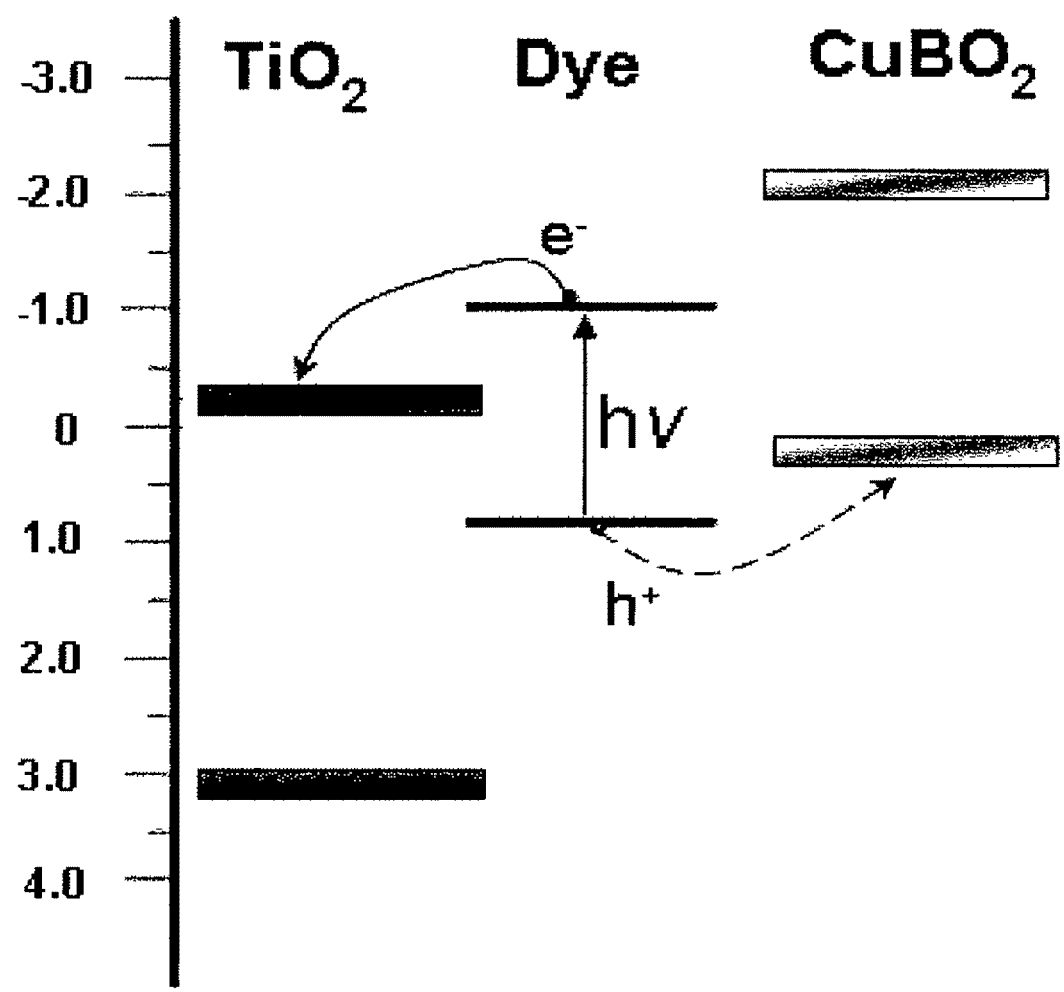
FIG. 10 is a schematic diagram showing the energy levels of $TiO_2$, the ground and excited states of Ruthenium (Ru-535) dye, and a $CuBO_2$ thin film fabricated according to embodiments of the invention.

In FIG. 10 the energy level diagrams of $TiO_2$ {R. Memming, "Solar energy conversion by photoelectrochemical processes", Electrochemical Acta. 25, 77-88 (1980)}, ruthenium dye [cis-bis(isothiocyanato)bis(2,2'-bipyridyl-4,4'-dicarboxylate)-ruthenium(II), hereafter referred as Ru-535 dye {Nazeeruddin et al., "Engineering of Efficient Panchromatic Sensitizers for Nanocrystalline $TiO_2$-based Solar Cells", Journal of the American Chemical Society 123, 1613-1624 (2001)}], and $CuBO_2$ pellet, made as described above, are shown. The excited energy level of the dye lies at 0.66 eV above the conduction band of $TiO_2$ while the ground state of the dye lies 0.39 eV below the valence band of $CuBO_2$. As is evident, these energy level positions satisfy the condition for charge separation of photo-generated electron-hole pairs very well. So, if an electron-hole pair is generated in the dye, the electron will readily be injected into the conduction band of $TiO_2$ and the hole to the valence band of $CuBO_2$. FIG. 10 shows the energy levels of Ru-535 dyes only; however, there are several other dyes which can favorably satisfy the energy level requirement. This is discussed in more detail below.

Figure 11:
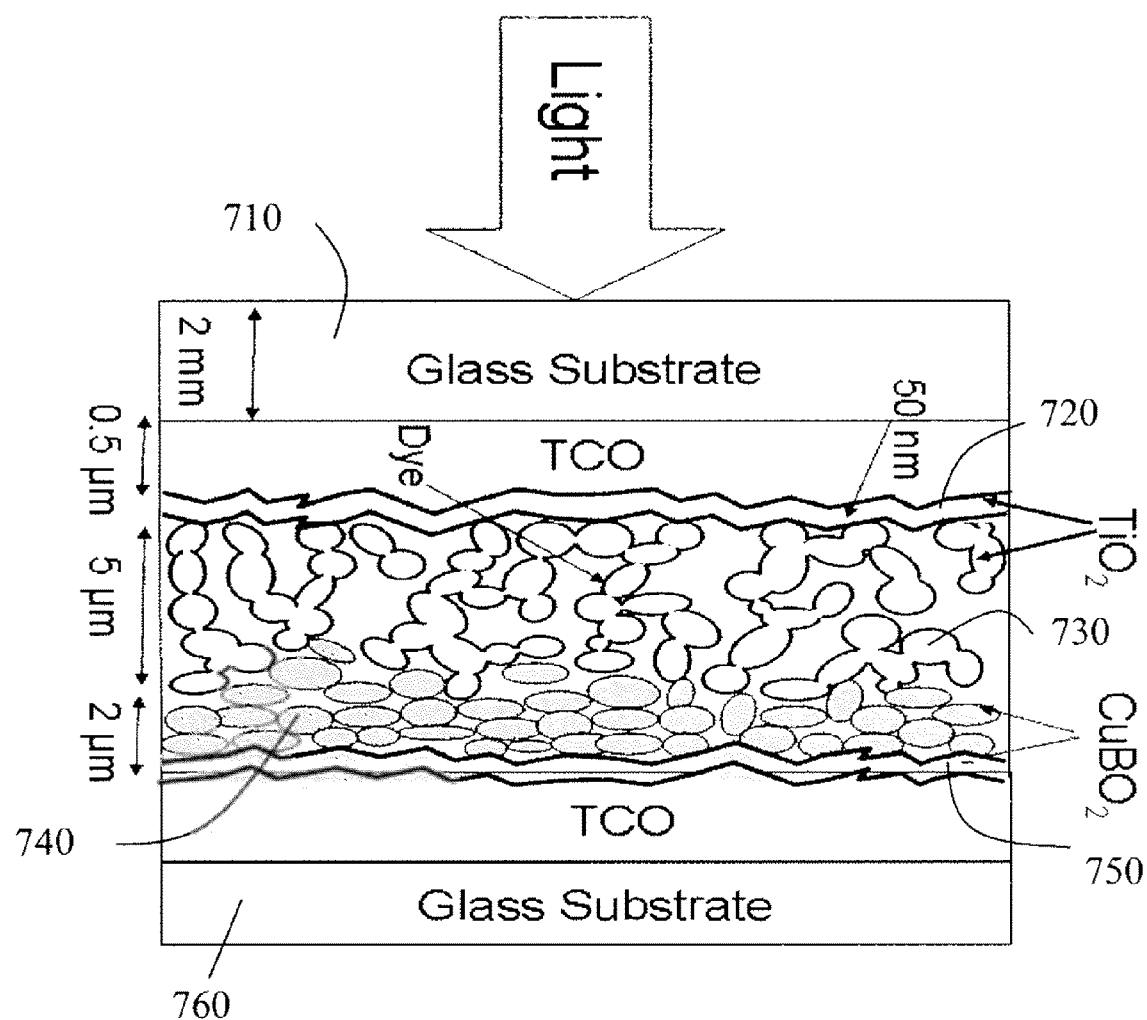
FIG. 11 is a schematic diagram of a solid-state DSSC, according to embodiments of the invention.

A prototype DSSC was fabricated and its performance and conversion efficiency were evaluated. A schematic diagram of the cell is shown in FIG. 11. The cell was fabricated as follows. First of all a thin solid film of $TiO_2$ 720 (30-100 nm thick) was deposited on an electrically conductive indium tin oxide (ITO) coated glass plate 710 by spray pyrolysis. This was followed by the pressing of a mesoporous $TiO_2$ layer 730 onto the sprayed $TiO_2$ layer 720. For this, 500 mg of $TiO_2$ nano-powder (diameter ~5 nm) was suspended in 10 mL of pure ethanol by stirring for several hours followed by 10 minutes of sonication using a titanium horn immersed in the suspension. The slurry was spread onto the surface of the ITO/$TiO_2$ substrate by tape casting using a spacer layer of scotch tape (10 um thick). The resulting layer of ethanol/$TiO_2$ was allowed to dry in the ambient atmosphere. The very loose film of particles that resulted was then pressed between two steel plates at 100 kg/cm² for 2 minutes. Under such pressures, films compress significantly, decreasing from an initial porosity of over 90% to about 70% (see FIG. 6). The $TiO_2$ layers were then heated for 2 hours at 500° C. in air. The films were cooled to room temperature and were dyed by immersing them in a 5.0×10⁻⁴ M solution of cis-bis(thiocyanate)bis (2,2-bipyridyl4,4-dicarboxylate) ruthenium(II) in ethanol for 6 hours. For the hole collector coating 740, a few drops of $CuBO_2$ suspension in ethanol were placed on the dyed $TiO_2$ film and spin coated at 800 rpm for 2 min. On the dyed $TiO_2$/$CuBO_2$ layer, a thin layer of graphite was applied for better electrical contact between the electrode and a back contact. A conducting indium tin oxide (ITO) coated glass plate 760 with a thin layer (~50 nm) of dense $CuBO_2$ 750 was used as the back contact. The dense back contact 750 was applied to the ITO coated glass plate 760 by PLD. Alternatively, deposition of back contact 750 may be by sputter deposition, molecular beam epitaxy (MBE) pulsed electron beam deposition, electron beam evaporation, other physical vapor deposition techniques, and sol-gel/chemical deposition techniques.

Figure 12:
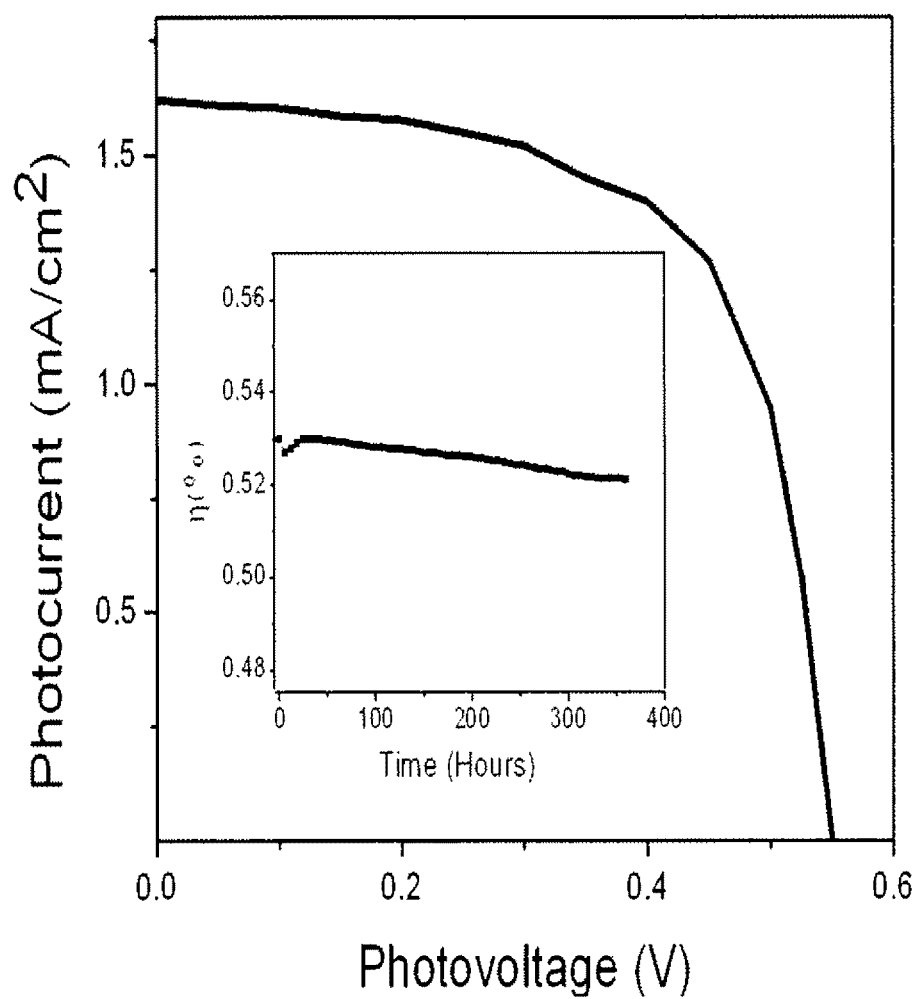
FIG. 12 is a graph of the photocurrent-voltage characteristics of a $CuBO_2$-based DSSC, with an inset showing the conversion efficiency ($\eta$) of the cell as a function of time, measured from a DSSC made according to embodiments of the invention.

The energy conversion efficiency was measured under simulated sunlight (AM 1.5, 100 mWcm$^{-2}$ illumination). FIG. 12 shows a typical photocurrent density vs. voltage curve for the CuBO$_2$ based DSSC. The values of the open-circuit voltage ($V_{oc}$), short circuit photocurrent density ($J_{sc}$) and fill factor (FF) are 550 mV, 1.6 mA cm$^{-2}$ and 0.61, respectively. The solar cell's overall energy conversion efficiency ($\eta = FF \times V \times I_{sc}/P_{in}$) was calculated to be 0.53%. The stability of the solid-state DSSC was determined by the computer controlled measurements of the photocurrent vs. voltage characteristics under continuous illumination for 15 days (360 hrs). Measurements were performed at regular intervals of six hours. Over a period of 15 days only a decrease of 2% in the conversion efficiency of the cell was observed (see inset of FIG. 12).

Figure 13A:
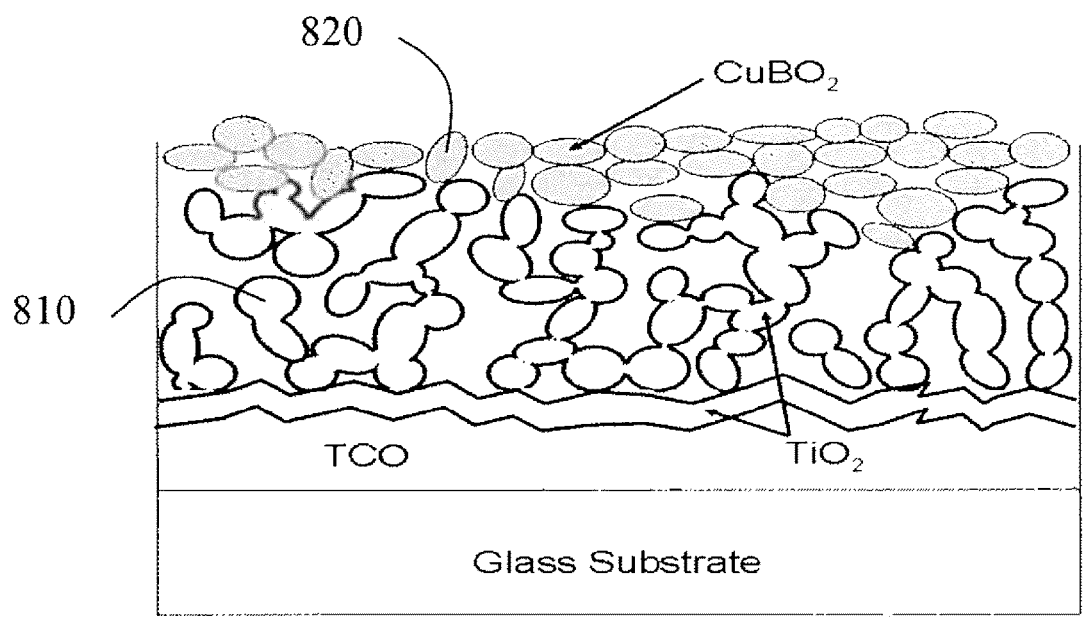
FIGS. 13A & 13B are schematic diagrams showing a mesoporous $TiO_2$ film with (A) larger size $CuBO_2$ particle, (B) nanosize $CuBO_2$ powder, prepared by methods according to embodiments of the invention.
Figure 13B:
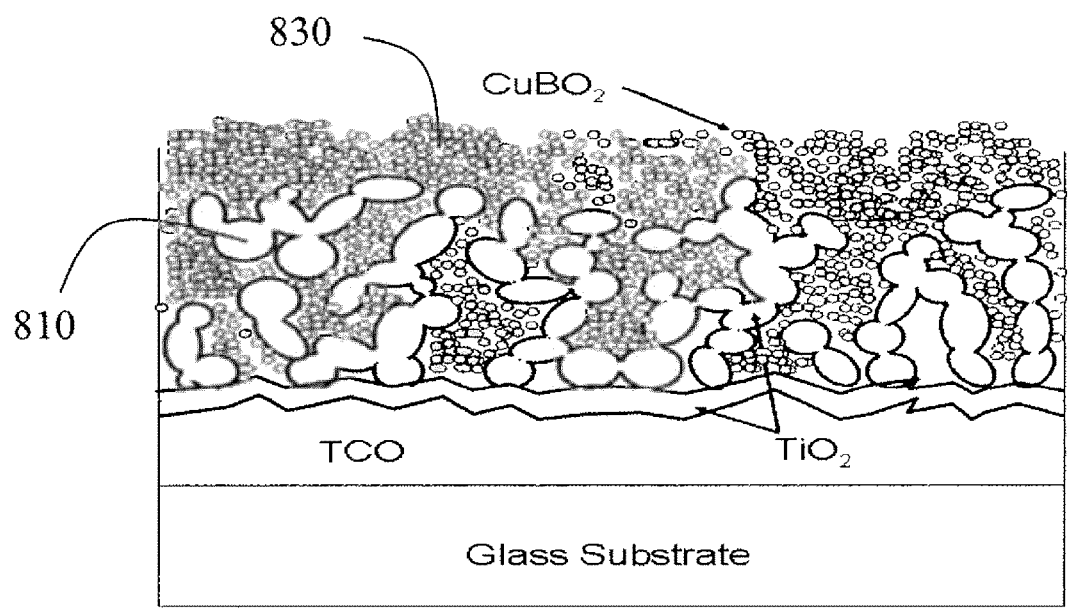

Fabrication of Solid-State DSSC by Preparing Ultrafine Powders of CuBO$_7$ which can Penetrate Through the Dyed Porous TiO$_2$ Network FIG. 13A shows the situation where CuBO$_2$ particles 820 are too large to efficiently penetrate the mesoporous TiO$_2$ network 810 (pore size ~50 nm-100 nm), this is the case for CuBO$_2$ powders (particle size ~200 nm) produced by the sol-gel process described above. In contrast, FIG. 13B shows the situation where the CuBO$_2$ particles 830 are sufficiently small (~20 nm) to penetrate the dyed TiO$_2$ network 810. DSSCs were fabricated using nano-sized particles of CuBO$_2$, as produced by the nanopowder tool described above and the method described above, resulting in devices in which the CuBO$_2$ particles have penetrated the dyed TiO$_2$ network. Using these nanosized powders, a higher fraction of p-type oxide enters inside the pores of the mesoporous TiO$_2$, which results in higher conversion efficiency. Detailed measurements of the energy conversion efficiency were performed as described above, and were in the range of 0.6-1.0%. (Note that a variation of this method is to dye the structure after CuBO$_2$ particles have been added to a mesoporous TiO$_2$ structure, rather than dying the mesoporous TiO$_2$ structure before adding the CuBO$_2$ particles.)

Figure 14:
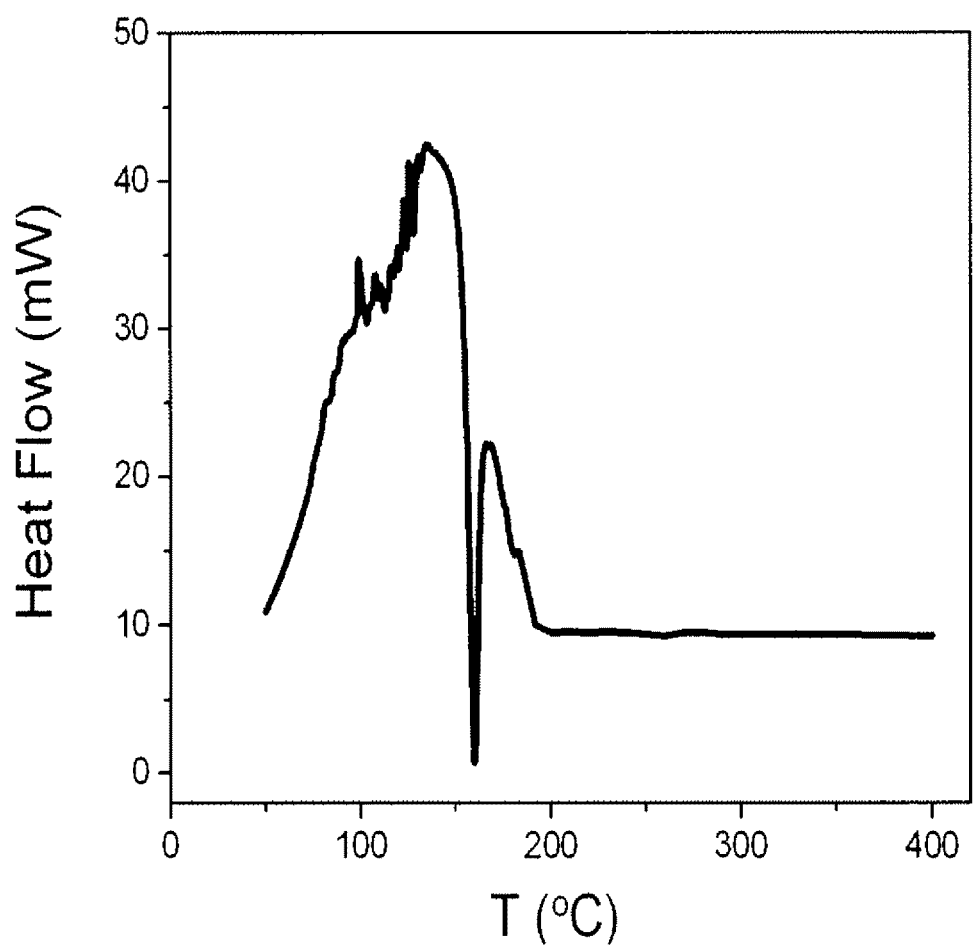
FIG. 14 is a graph showing differential scanning calorimetry (DSC) for citrate gel used for preparing $CuBO_2$, according to embodiments of the invention.
Figure 15A:
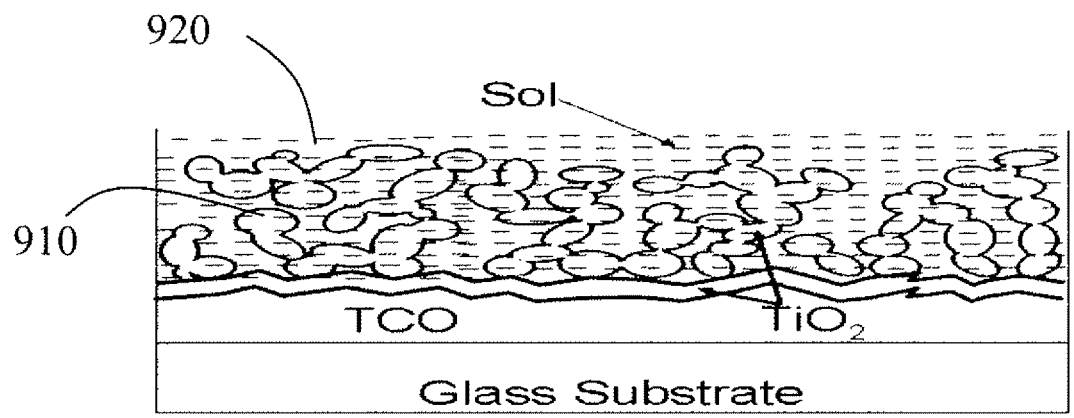
FIGS. 15A, 15B & 15C are schematic diagrams showing: (A) citrate sol filling in the pores of a mesoporous $TiO_2$ film, (B) gel inside a mesoporous $TiO_2$ film, and (C) interpenetrating network of $TiO_2$ and $CuBO_2$ nanosize particles, according to embodiments of the invention.
Figure 15B:
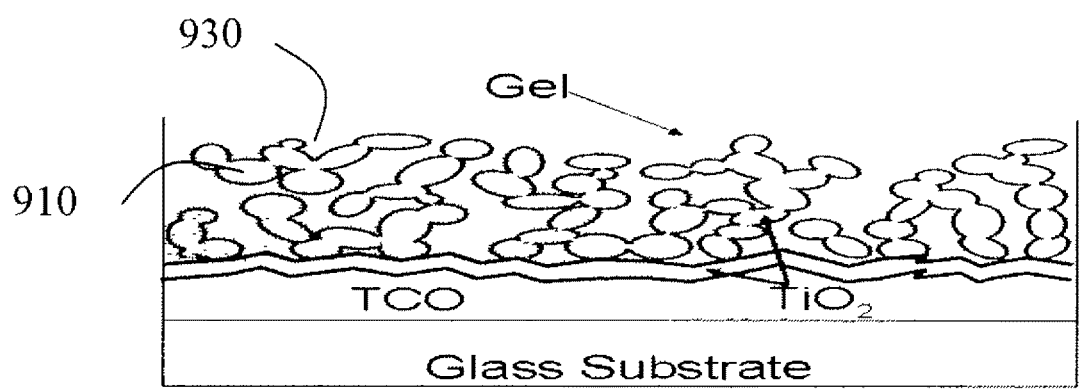
Figure 15C:
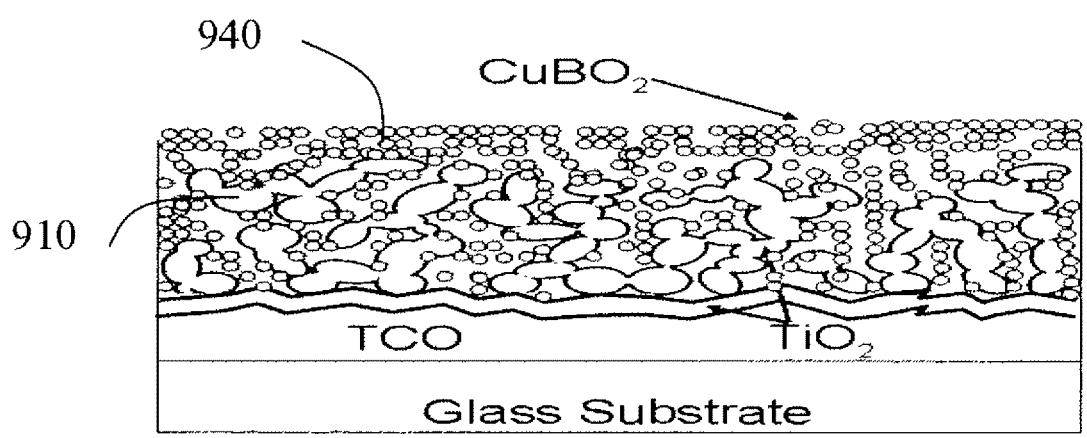

Fabrication of Solid-State DSSC by Depositing P-Type Oxide into the Pores of a TiO$_2$ Network by a Sol-Gel Technique CuBO$_2$ material was deposited inside the pores of a TiO$_2$ network by a sol-gel technique, as shown in FIGS. 15A, 15B & 15C. This process has two variations. In the first variation, CuBO$_2$ material is deposited inside the pores of a dye-coated TiO$_2$ network. FIG. 14 shows differential scanning calorimetry (DSC) data of the citrate gel used for preparing CuBO$_2$. FIG. 14 shows that the decomposition of the gel to CuBO$_2$ occurs at ~160° C. The decomposition temperature of Ruthenium dye (Ru-535) is 250° C., showing that CuBO$_2$ can be deposited in the pores of a dye-coated TiO$_2$ network by this sol-gel technique without damaging the Ru-535. To deposit the CuBO$_2$ within the pores, the first step is to introduce dilute citrate sol 920 containing chelated Cu$^{2+}$ and B$^{3+}$ ions into the pores of dye-coated TiO$_2$ network 910 (see FIG. 15A). This is followed by evacuation of the sol-soaked TiO$_2$ film at about 80° C. to convert the sol to gel. The evacuation is done by applying a vacuum in order to keep the temperature low enough to avoid damage of the dye. The above two steps are repeated several times to fill the pores with the desired amount of gel 930 (see FIG. 15B). After this, the mesoporous TiO$_2$ containing gel is heated to 160° C. At this temperature the gel decomposes to form CuBO$_2$ powder 940 which is likely to be uniformly dispersed inside the TiO$_2$ network 910 (see FIG. 15C). However, CuBO$_2$ formed at this temperature is quite amorphous, which may negatively impact the performance of the cell. Detailed measurements of the energy conversion efficiency were performed as described above, and were in the range of 0.5-0.9%.

In the second variation of the sol-gel based process, CuBO$_2$ material was deposited inside the pores of an uncoated (without dye) TiO$_2$ network structure. The process described above is followed, with the following differences. In this variation there is the freedom to increase the temperature of the system to 500° C. (because the dye has not yet been added to the cell yet) for the purpose of increasing the crystallinity of the CuBO$_2$. The uniformly dispersed TiO$_2$—CuBO$_2$ system was annealed in flowing oxygen to compensate for any oxygen non-stoichiometry of the TiO$_2$—CuBO$_2$ material system because of the carbonaceous byproducts of the gel-decomposition. The TiO$_2$—CuBO$_2$ system was dyed by immersion in the dye solution for 6-12 hours. Because of the tendency of these materials to become porous, there is some spacing between CuBO$_2$ particles in the pores in the network and the walls of the TiO$_2$ network. Dye molecules reach these spaces due to capillary action. The resulting structure is similar to that of FIG. 15C, except the CuBO$_2$ particle size will likely be larger. There are several parameters that will have to be optimized such as the amount of CuBO$_2$, the amount of dye, the pore size of the TiO$_2$ network, etc. Detailed measurements of the energy conversion efficiency were performed as described above, and were in the range of 0.5-0.9%.

Figure 16:
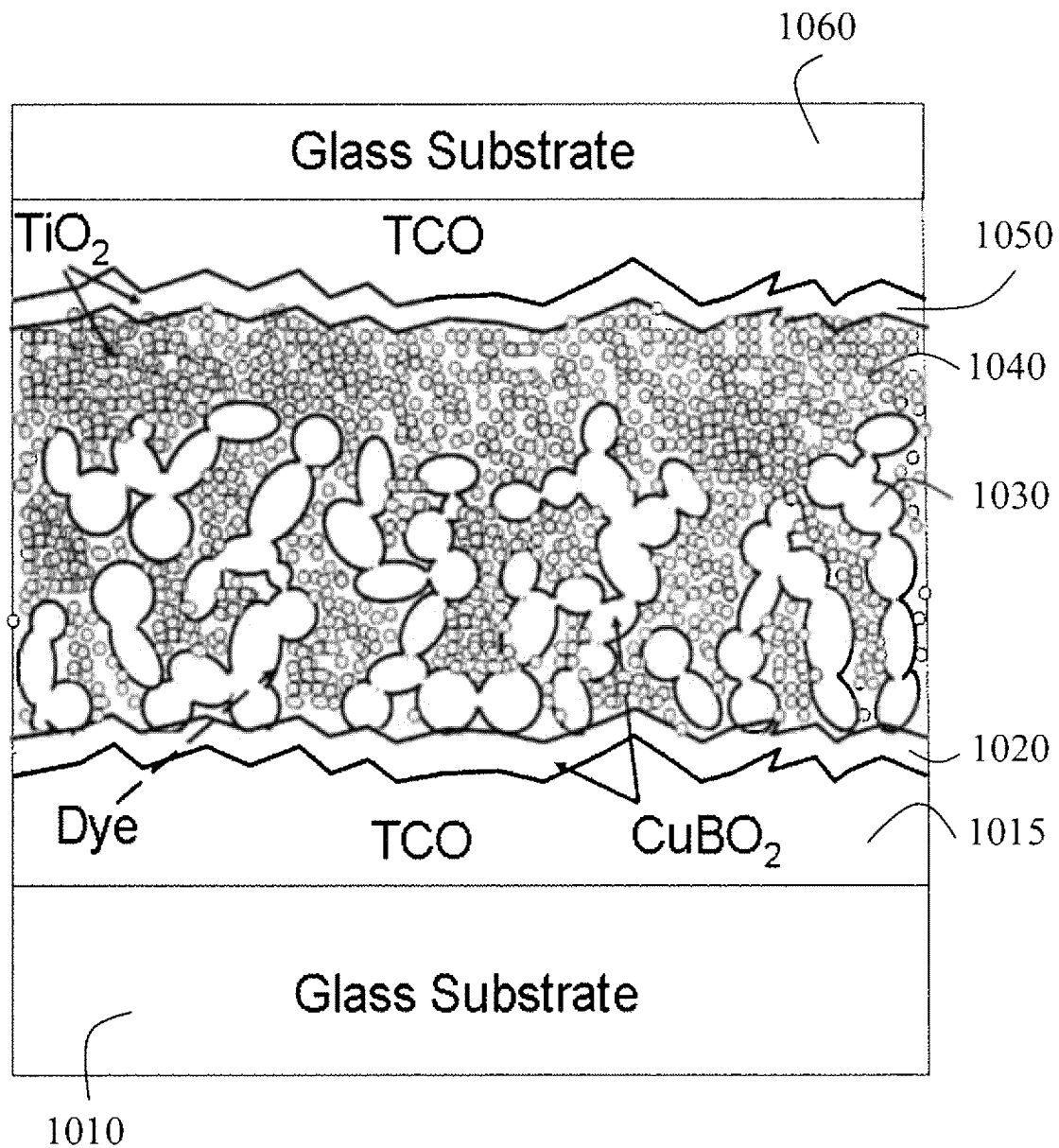
FIG. 16 is a schematic diagram of a DSSC with a network of nanosize $CuBO_2$ particles, according to embodiments of the invention.

Fabrication of Solid-State DSSC by Preparing a Porous Network of CuBO$_2$ in Which TiO$_2$ Particles can be Embedded A solid-state DSSC was fabricated by first preparing a porous network of CuBO$_2$ and then creating an interpenetrating network of TiO$_2$ nano-particles. Most of the work on DSSC has been done by making porous networks of TiO$_2$ and then inserting electrolyte inside the pores. However, when using solid p-type hole collectors, the order of the fabrication steps may be reversed. This approach will be specially significant for CuBO$_2$ based hole collectors, where the particles or grains have an inherent tendency to grow larger in size. The grain/particle growth occurs over time at temperature by solid state diffusion and Oswald ripening. FIG. 16 shows a schematic diagram of this DSSC cell structure.

In FIG. 16, the DSSC consists of a glass substrate 1010 with a coating of transparent conducting oxide (ITO) 1015. A thin (50 nm) dense coating of CuBO$_2$ 1020 is deposited over the substrate 1010, 1015 by a pulsed laser deposition (PLD) technique using the same protocol as described above. After this, a mesoporous CuBO$_2$ layer 1030 is deposited over the dense CuBO$_2$ layer 1020. For this, a small amount of CuBO$_2$ powder (average diameter ~100 nm) is suspended in pure ethanol by stirring for several hours and then spread onto the surface of the substrate. The resulting layer of ethanol/CuBO$_2$ powder is dried in ambient atmosphere followed by pressing between two steel plates at 100 kg/cm$^2$ for 2-5 minutes. Under such pressures, CuBO$_2$ layers 1030 compress significantly. The CuBO$_2$ layers 1030 are then heated for 2-5 hrs at 500° C. in air. For inserting TiO$_2$ nanoparticles 1040 inside the pores of the CuBO$_2$ layer 1030, a few drops of TiO$_2$ suspension in ethanol is placed on the CuBO$_2$ layer 1030 and spin coated at about 1000 rpm for 2 min. This step is repeated several times to insert the desired amount of TiO$_2$ nano-particles 1040 in the pores of the CuBO$_2$ layer 1030. This is followed by annealing at 500° C. in air. The interpenetrating network of TiO$_2$ and CuBO$_2$ thus obtained is coated by dye by dipping it in an ethanolic solution of dye. In the final step, the DSSC is assembled by placing a transparent conducting electrode 1060 with a dense layer of TiO$_2$ 1050 over it. Slight pressure applied to compress the DSSC is sufficient to ensure good electrical contact. Detailed measurements of the energy conversion efficiency were performed as described above, and were in the range of 0.6-1.0%.

Figure 17A:
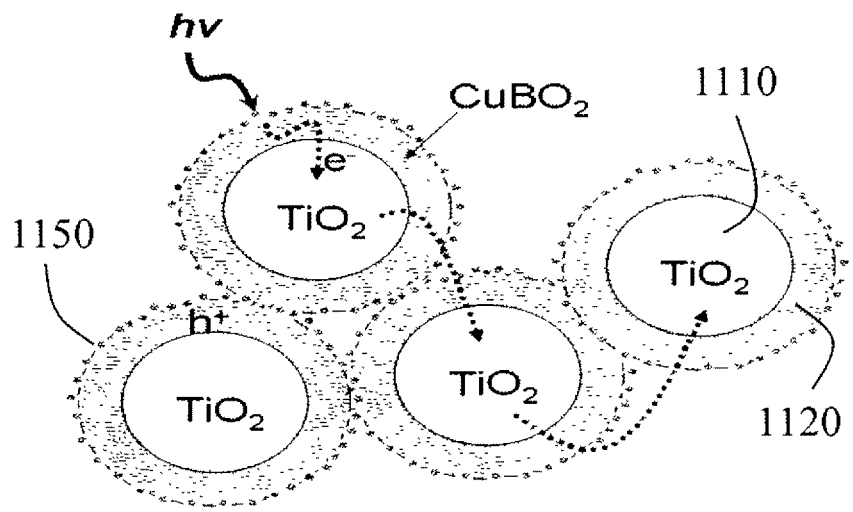
FIGS. 17A & 17B are schematic diagrams of $TiO_2$—$CuBO_2$ "core-shell" nano particles—(A) shows particles with $TiO_2$ as the core and $CuBO_2$ as the shell layer and (B) shows particles with $CuBO_2$ as the core and $TiO_2$ as the shell layer, according to embodiments of the invention.
Figure 17B:
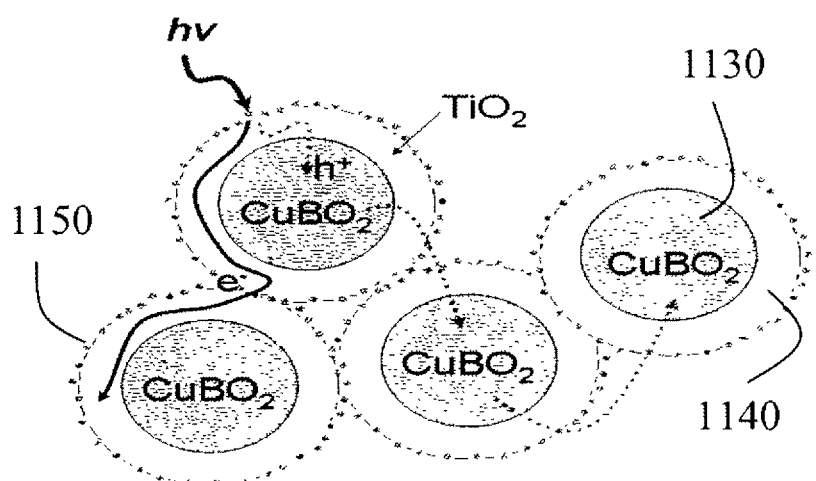

Fabrication of Solid-State DSSC by Using $TiO_2$—$CuBO_7$ "Core-Shell" Nano-Particles FIGS. 17A & 17B show $TiO_2$—$CuBO_2$ "core-shell" nano-particles that were designed specifically to enable a new method of forming a DSSC. In conventional DSSCs, the device is fabricated in such a manner that the dye layer lies in between the n-type semiconductor and the hole collector layer. However, in some embodiments of the present invention, dye is not coated on the interface of $TiO_2$ and $CuBO_2$, rather it is coated on the surface of $TiO_2$—$CuBO_2$ "core-shell" particles.

$TiO_2$—$CuBO_2$ "core-shell" particles were prepared. These "core-shell" particles were used for fabricating DSSCs by sensitizing the outer surface of the "core-shell" particles with a dye 1150. Two different kinds of "core-shell" particles were synthesized: (i) $TiO_2$1110 as core and $CuBO_2$ 1120 as shell layer (FIG. 17A), and (ii) $CuBO_2$ 1130 as core and $TiO_2$ 1140 as shell layer (FIG. 17B). For preparing "core-shell" nano-particles with a $TiO_2$ core, $TiO_2$ nano-particles were washed with a dilute nitric acid solution (pH~4) and a small amount of tetraethyl orthotitanate ($Ti(OC_2H_5)_4$) was added so as to barely coat the nano-particles. After stirring for an hour, the pH of the suspension was adjusted to 5-6, and acidic nitric acid solutions of $CuO_2$ and $B_2O_3$ were added drop wise to the suspension while stirring. To encourage "core-shell" nano-particle formation and to avoid the formation of solid $CuBO_2$, the rate of addition of drops was kept low, and if needed the pH of the $TiO_2$ nanoparticle suspension was adjusted to change the rate of $CuBO_2$ formation. The amount of $CuO_2$ and $B_2O_3$ needed to obtain shells of desired average thickness was determined experimentally, and the shell thickness measured directly using transmission electron microscopy. For preparing "core-shell" nano-particles with a $CuBO_2$ core, $CuBO_2$ nano-particles were washed with dilute nitric acid (pH~4) and sufficient tetraethyl orthotitanate was added so as to barely coat the nano-particles. (The $CuBO_2$ cores are manufactured using one of the methods described above, depending on the desired particle size.) After stirring for an hour, additional aliquots of orthotitanate were added until the desired shell thickness was obtained. Final products were washed with deionized water and characterized with TEM and SEM to evaluate "core-shell" morphology and overall size and shape distributions.

Figure 18:
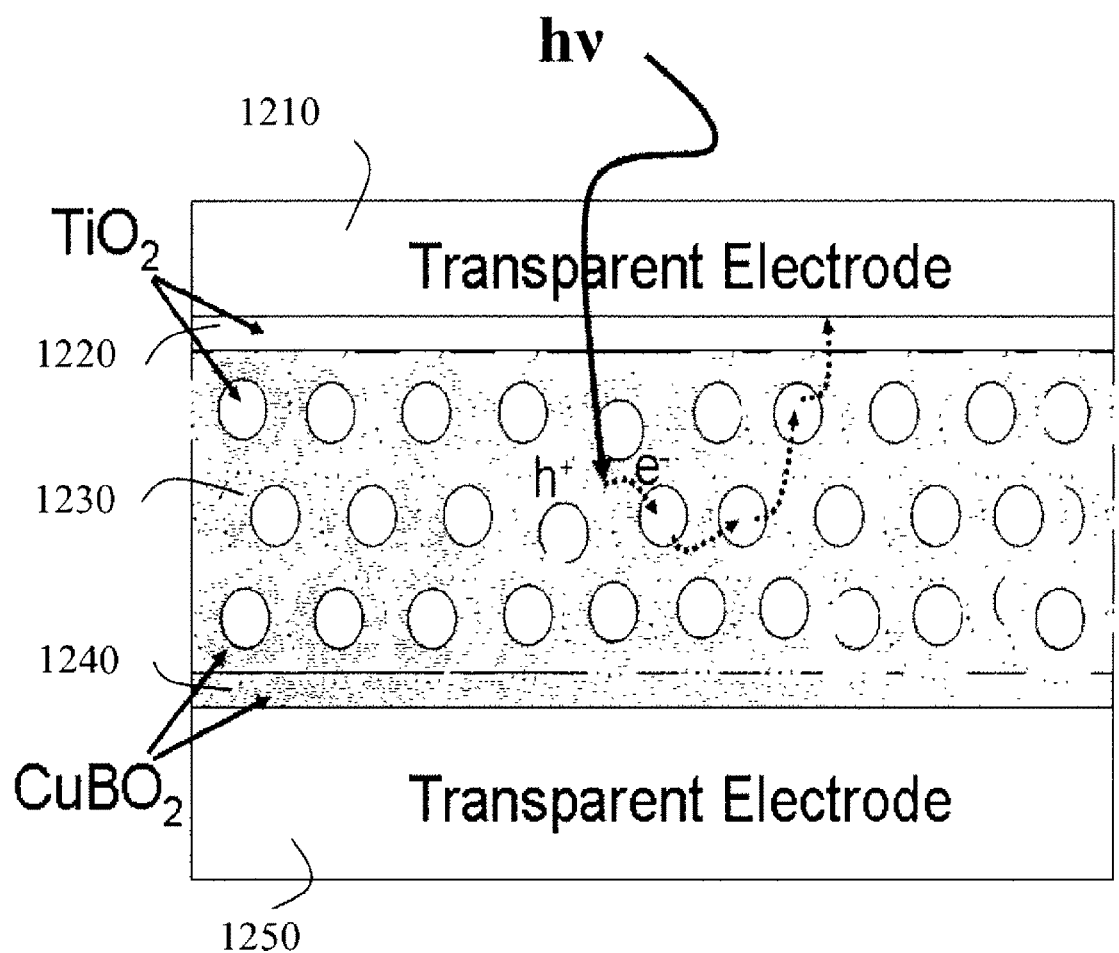
FIG. 18 is a schematic diagram of a DSSC made with $TiO_2$—$CuBO_2$ "core-shell" particles, according to embodiments of the invention.

To assemble the DSSC shown in FIG. 18, a transparent conducting electrode 1210 with a thin coating of $TiO_2$ 1220 was dipped in dilute nitric acid to chemically activate the electrode surface and make a good seal between it and the active device layers. A concentrated suspension of "core-shell" particles 1230 was mixed with electron transfer dye solution in ethanol and spray dried onto the surface. A small amount of dilute nitric acid solution of $CuO_2$ and $B_2O_3$ was spray dried over this and then the $CuBO_2$ coated 1240 transparent conducting counter electrode 1250 was placed on top. The entire structure was heated for several minutes at around 80° C. in a vacuum environment to remove solvent and anneal the layers. Detailed measurements of the energy conversion efficiency were performed as described above, and were in the range of 1.0-1.2%.

Fabrication of Solid-State DSSC by Using $TiO_2$—$CuBO_2$ "Nano-Couples"

Figure 19:
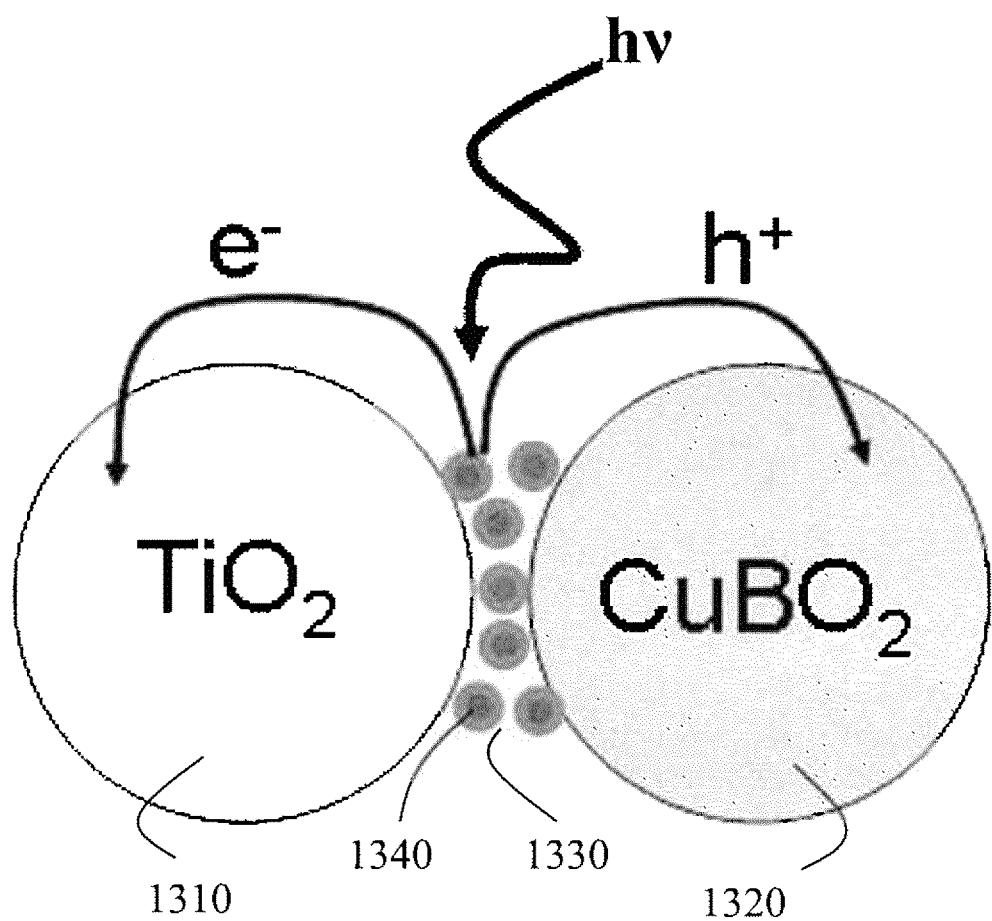
FIG. 19 is a schematic diagram of a $TiO_2$ and $CuBO_2$ "nano-couple", according to embodiments of the invention.

In this case $TiO_2$ and $CuBO_2$ are held together in couples using a polymer connector. These "nano-couples" are capable of simultaneously harvesting light and separating charge. A schematic diagram of the $TiO_2$—$CuBO_2$ "nano-couple" is shown in FIG. 19. The "nano-couple" includes a pair of $TiO_2$ 1310 and $CuBO_2$ 1320 particles held together by a polymer spacer 1330. The polymer spacer 1330 also provides an interface between the particles where ionizable light absorbing dyes 1340 are accumulated. The electrons and holes generated in the dye 1340 are able to quickly transfer to $TiO_2$, 1310 and $CuBO_2$ 1320 particles, respectively.

Figure 20:
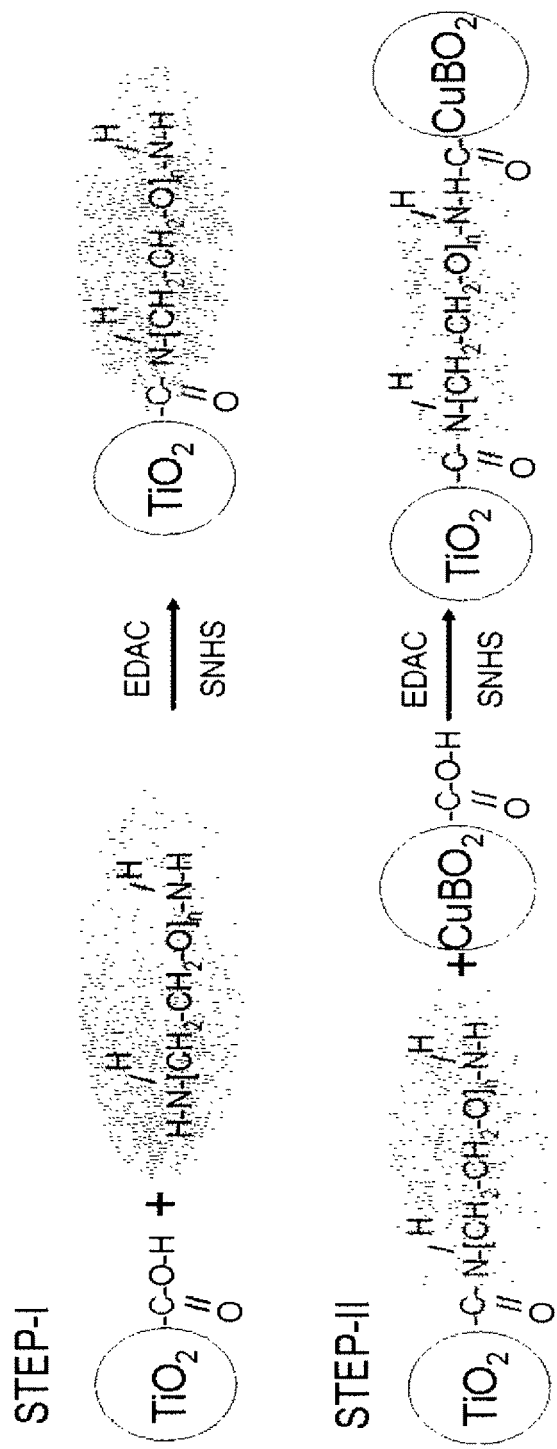
FIG. 20 is a schematic diagram illustrating the steps involved in the synthesis of $TiO_2$—$CuBO_2$ "nano-couples", according to embodiments of the invention.

"Nano-couples" are synthesized starting with $TiO_2$ and $CuBO_2$ nanoparticles as raw materials and using the steps described in FIG. 20. (The $CuBO_2$ nanoparticles are manufactured using one of the methods described above, depending on the desired particle size.) To start with, $TiO_2$ nano-particles are bound to a column of hydrophilic chromatography media (such as provided by BioRad, Hercules, Calif.). The column is washed with ethanol to remove loose nano-particles. After this, the column is again washed with 1 M carboxyethylphosphoric acid (CEPA) in ethanol to functionalize the exposed $TiO_2$ nanoparticle surfaces with carboxylic acid groups. The column is unpacked for use as slurry. 1-Ethyl-3-[3-dimethylaminopropyl]carbo-diimide hydro-chloride (EDAC) and N-hydroxysulfo-succinimide (SNHS) are added to the slurry (1 equivalent for each carboxylic group on the surface of the nano-particles) and stirred for 30 minutes at room temperature. Then PEG coupler, $NH_2$—$PEO_n$—$NH_2$, is added to the slurry and stirred overnight at room temperature. The slurry is washed with ethanol to remove unreacted material but retain $TiO_2$ nano-particles. In a separate column $CuBO_2$ nano-particles bound to their support are reacted with CEPA to functionalize them partially with carboxylic acid groups. They are eluted with an aqueous ethanol gradient, and dialyzed to remove unreacted materials. This purified material is applied to the slurry containing $TiO_2$ nano-particles and EDAC, and SNHS is added to link the particles together. The recovered material is dialyzed to remove any residual CEPA, EDAC, and SNHS. Ruthenium complexes are attached to the PEG linker in the "nano-couples" by reacting with sodium hydride in dimethylformamide (DMF), via the procedure outlined in Zhang et al., "Oxidation chemistry of poly(ethylene glycol)-supported carbonylruthenium(II) and dioxoruthenium(VI) mesotetrakis (pentafluorophenyl) porphyrin", Chemistry 12, 3020-303 (2006). By systematic manipulation of the length and structure of the spacer polymer, the separation between the particles and the amount of dye inserted between them is varied. $TiO_2$—$CuBO_2$ "nano-couples" are used to fabricate DSSCs by using the same protocol as described above for the "core-shell" particles. Detailed measurements of the energy conversion efficiency were performed as described above, and were in the range of 1.0-1.4%.

Ru-535 has been used as an example of a suitable ruthenium-based sensitizing dye for use in the DSSCs described above; however, other dyes may be used, including low cost dyes. Some examples of alternative dyes are copper and iron based dyes, such as $Cu(3)_2[PF_6]$ or $FeL_2(CN)_2$. Furthermore, a nonaqueous solvent with high dielectric constant, such as hydrazine, can be used to enhance the adhesion of the dye to semiconducting electrodes, such as the $CuBO_2$ and $TiO_2$. (Excess adhesion promoter can be removed by applying a vacuum or evaporation at elevated temperature.)

$TiO_2$ has been used as an example of a suitable n-type semiconductor material for use in the SS-DSSCs described above. However, other materials may be used as an alternative to $TiO_2$ including ZnO and $ZrO_2$. For example: ZnO and $ZrO_2$ may be used in place of $TiO_2$ in forming "core-shell" nano-particles with copper boron oxide; and ZnO and $ZrO_2$ nano-particles may be used in place of $TiO_2$ nanoparticles in forming "nano-couples" with copper boron oxide nanoparticles.

Furthermore, as described earlier, the p-type copper boron oxide in the examples of SS-DSSCs given above may be replaced by other p-type copper delafossite materials, such as $CuAlO_2$, $CuGaO_2$ and $CuInO_2$.

In alternative embodiments of the present invention the deposition of the copper boron oxide thin films may include sputtering techniques, molecular beam epitaxy (MBE), pulsed electron beam deposition, electron beam evaporation, other physical vapor deposition techniques and sol-gel deposition techniques. The citrate sol-gel process used to form copper boron oxide powders may be adapted to synthesize copper boron oxide thin films. Sol-gel solutions are prepared as described above. After refluxing, the solvent is partially evaporated creating a viscous liquid. The viscous liquid is then used to deposit copper boron oxide thin films by solution deposition techniques such as, dip coating, spray coating, ink jet printing or spin coating. Deposited films are dried at approximately 50° C. and additional coats may be deposited, if needed to achieve a desired thickness thin film. The dried sol-gel coating is sintered between 70 and 200° C. under vacuum between 5 and 50 Torr to fowl the copper boron oxide thin film. After formation of the copper boron oxide film the sintering temperature may be increased to in the region of 300-600° C. (depending on temperature restrictions due to substrate type, etc.) to densify the film.

Although the copper boron oxide material of the present invention has been described as having a delafossite crystal structure, alternative crystal structures may also exist for this material, including hexagonal close packed (HCP).

Although the present invention has been particularly described with reference to embodiments thereof, it should be readily apparent to those of ordinary skill in the art that changes and modifications in the form and details may be made without departing from the spirit and scope of the invention.

What is claimed is:

1. A thin film solar cell comprising:
a substrate;
a copper boron oxide p-layer over said substrate, said copper boron oxide p-layer comprising an optically transparent p-type semiconductor, wherein said optically transparent p-type semiconductor is $CuBO_2$ copper delafossite;
a thin film of n-type transparent conducting oxide between said substrate and said copper boron oxide p-layer;
an amorphous silicon absorber layer over said copper boron oxide p-layer;
a n-type amorphous silicon layer over said amorphous silicon absorber layer; and
a back contact layer over said n-type amorphous silicon layer.

2. The thin film solar cell as in claim 1, wherein said copper boron oxide p-layer is a thin film, said thin film having a thickness in the range of 8 to 100 nanometers.

3. The thin film solar cell as in claim 1, wherein said substrate comprises glass.

4. A thin film solar cell comprising:
a substrate;
a transparent n-layer over said substrate; and
a p-layer between said substrate and said transparent n-layer;
wherein said p-layer comprises an absorber material and a copper boron oxide layer, said copper boron oxide layer comprising an optically transparent p-type semiconductor, wherein said optically transparent p-type semiconductor is $CuBO_2$ copper delafossite.

5. The thin film solar cell as in claim 4, wherein said absorber material comprises copper indium gallium selenide.

6. The thin film solar cell as in claim 4, wherein said copper boron oxide p-layer is a thin film, said thin film having a thickness of 20 nanometers.

7. The thin film solar cell as in claim 4, wherein said copper boron oxide p-layer is between said absorber material and said transparent n-layer.

8. A thin film solar cell comprising:
a substrate; and
a p-layer over said substrate;
wherein said p-layer comprises a copper boron oxide p-layer and a second layer of p-type material, said copper boron oxide p-layer comprising an optically transparent p-type semiconductor, wherein said optically transparent p-type semiconductor is $CuBO_2$ copper delafossite, and wherein said second layer of p-type material is selected from the group consisting of a layer of p-type amorphous silicon, a layer of p-type microcrystalline silicon and a layer of p-type microcrystalline silicon carbide.

9. The thin film solar cell as in claim 8, wherein said second layer of p-type material is said layer of p-type amorphous silicon.

10. The thin film solar cell as in claim 8, wherein said second layer of p-type material is said layer of p-type microcrystalline silicon.

11. The thin film solar cell as in claim 8, wherein said second layer of p-type material is said layer of p-type microcrystalline silicon carbide.

12. A thin film solar cell comprising:
a substrate;
a transparent conductive layer over said substrate;
a first copper boron oxide p-layer over said transparent conductive layer, said first copper boron oxide p-layer comprising an optically transparent p-type semiconductor, wherein said optically transparent p-type semiconductor is $CuBO_2$ copper delafossite;
a first layer of intrinsic semiconductor over said first copper boron oxide p-layer;
a first n-type semiconductor layer over said first layer of intrinsic semiconductor;
a second copper boron oxide p-layer over said first n-type semiconductor layer, said second copper boron oxide p-layer comprising an optically transparent p-type semiconductor, wherein said optically transparent p-type semiconductor is $CuBO_2$ copper delafossite;
a second layer of intrinsic semiconductor over said second copper boron oxide p-layer;
a second n-type semiconductor layer over said second layer of intrinsic semiconductor; and
a back contact layer over said second n-type semiconductor layer.

13. The thin film solar cell as in claim 12, wherein said substrate comprises glass.

14. The thin film solar cell as in claim 12, wherein said first and second copper boron oxide p-layers have thicknesses in the range of 8 to 100 nanometers.

15. The thin film solar cell as in claim 12, wherein said first layer of intrinsic semiconductor and said second layer of intrinsic semiconductor are comprised of different materials.

16. The thin film solar cell as in claim 15, wherein said first layer of intrinsic semiconductor comprises amorphous silicon and said second layer of intrinsic semiconductor comprises microcrystalline silicon.

* * * * *

UNITED STATES PATENT AND TRADEMARK OFFICE
CERTIFICATE OF CORRECTION

PATENT NO. : 8,415,556 B2
APPLICATION NO. : 12/643380
DATED : April 9, 2013
INVENTOR(S) : Singh et al.

It is certified that error appears in the above-identified patent and that said Letters Patent is hereby corrected as shown below:

On the Title Page, in Item (75), under "Inventors", in Column 1, Line 3,
delete "Nety Krishna," and insert -- Nety M. Krishna, --, therefor.

On the Title Page, in Item (56), under "OTHER PUBLICATIONS", in Column 2, Line 1,
delete "al" and insert -- al. --, therefor.

On the Title Page, in Item (56), under "OTHER PUBLICATIONS", in Column 2, Line 4,
delete "al "P-Type Oxide Semiconducotrs" and
insert -- al. "P-Tyne Oxide Semiconductors --, therefor.

On the Title Page, in Item (56), under "OTHER PUBLICATIONS", in Column 2, Line 5,
delete "Solide State Solar Cells", Semicondcutor" and
insert -- Solid-State Solar Cells", Semiconductor --, therefor.

On Title Page 2, in Item (56), under "OTHER PUBLICATIONS", in Column 1, Line 11,
delete "Dioxuruthenium" and insert -- Dioxoruthenium --, therefor.

In the Specification:

In Column 3, Line 9, delete "invention; and" and insert -- invention; --, therefor.

In Column 3, Line 11, delete "invention." and insert -- invention; --, therefor.

In Column 4, Line 53, delete "10 tunes" and insert -- 10 times --, therefor.

In Column 8, Lines 63-64, delete "drain 650 and source 660" and
insert -- drain 660 and source 650 --, therefor.

Signed and Sealed this
Twenty-ninth Day of October, 2013

Teresa Stanek Rea
*Deputy Director of the United States Patent and Trademark Office*

CERTIFICATE OF CORRECTION (continued)
U.S. Pat. No. 8,415,556 B2

In Column 10, Line 2, delete "($V_b$)" and insert -- ($V_{fb}$) --, therefor.

In Column 10, Line 10, delete "SCE." and insert -- SCE). --, therefor.

In Column 11, Line 5, delete "($J_{sc}$)" and insert -- ($I_{sc}$) --, therefor.

In Column 11, Line 8, delete "($\eta = FF \times Y \times I_{sc}/P_{in}$)" and insert -- ($\eta = FF \times V_{oc} \times I_{sc}/P_{in}$) --, therefor.

In Column 13, Line 18, delete "TiO21110" and insert -- TiO2 1110 --, therefor.

In Column 14, Line 5, delete "$TiO_2$, 1310" and insert -- $TiO_2$ 1310 --, therefor.

In Column 14, Line 41, delete "3020-303" and insert -- 3020-3031 --, therefor.

In Column 15, Line 21, delete "fowl" and insert -- form --, therefor.